(12) United States Patent
Resnick

(10) Patent No.: US 11,993,375 B2
(45) Date of Patent: May 28, 2024

(54) METHOD AND APPARATUS FOR LIFTING A PAYLOAD

(71) Applicant: Parallel Flight Technologies, Inc., Ben Lomond, CA (US)

(72) Inventor: Joshua Alan Resnick, Ben Lomond, CA (US)

(73) Assignee: Parallel Flight Technologies, Inc., Ben Lomond, CA (US)

( * ) Notice: Subject to any disclaimer, the term of this patent is extended or adjusted under 35 U.S.C. 154(b) by 0 days.

(21) Appl. No.: 17/693,303

(22) Filed: Mar. 11, 2022

(65) Prior Publication Data

US 2022/0194584 A1 Jun. 23, 2022

Related U.S. Application Data

(63) Continuation of application No. 16/215,011, filed on Dec. 10, 2018, now abandoned.

(60) Provisional application No. 62/632,400, filed on Feb. 19, 2018.

(51) Int. Cl.
| | |
|---|---|
| *B64C 39/02* | (2023.01) |
| *B64D 27/02* | (2006.01) |
| *B64U 10/13* | (2023.01) |
| *B64U 50/11* | (2023.01) |
| *B64U 50/19* | (2023.01) |
| *B64U 101/60* | (2023.01) |

(52) U.S. Cl.
CPC .......... *B64C 39/024* (2013.01); *B64D 27/026* (2024.01); *B64U 10/13* (2023.01); *B64U 50/11* (2023.01); *B64U 50/19* (2023.01); *B64U 2101/60* (2023.01)

(58) Field of Classification Search
CPC ....... B64C 39/024; B64U 50/11; B64U 50/19; B64U 2101/60
See application file for complete search history.

(56) References Cited

U.S. PATENT DOCUMENTS

| | | |
|---|---|---|
| 6,270,038 B1 | 8/2001 | Cycon et al. |
| 10,494,117 B2 | 12/2019 | Bosma |
| 10,662,875 B2 * | 5/2020 | Lafargue ................. F01D 15/10 |
| 10,882,634 B2 | 1/2021 | Bosma |
| 11,148,820 B1 | 10/2021 | Resnick et al. |

(Continued)

FOREIGN PATENT DOCUMENTS

| | | |
|---|---|---|
| CN | 106741977 A | 5/2017 |
| DE | 102013209538 B4 | 12/2020 |

OTHER PUBLICATIONS

PCT/US2021/065248, "International Search Report and the Written Opinion", dated May 12, 2022, 18 pages.

(Continued)

*Primary Examiner* — Philip J Bonzell
*Assistant Examiner* — Ashesh Dangol
(74) *Attorney, Agent, or Firm* — Kilpatrick Townsend & Stockton LLP

(57) ABSTRACT

A method and apparatus for lifting a payload wherein a first mechanical-rotor is driven by an internal combustion engine. A portion of the mechanical work developed by the internal combustion engine is used to generate electrical power, which is either stored in a battery or used to power an electric motor that drives a second rotor. Thrust developed by the mechanical and electrical rotors is directed downward to provide lift for the payload.

11 Claims, 26 Drawing Sheets

(56) References Cited

U.S. PATENT DOCUMENTS

| | | | |
|---|---|---|---|
| 2008/0045373 A1 | 2/2008 | Rodgers | |
| 2008/0184906 A1* | 8/2008 | Kejha | B64C 39/024 |
| | | | 102/374 |
| 2013/0227950 A1 | 9/2013 | Anderson et al. | |
| 2014/0060004 A1 | 3/2014 | Mast et al. | |
| 2014/0084080 A1 | 3/2014 | Robertson et al. | |
| 2014/0220873 A1 | 8/2014 | Bleechmore et al. | |
| 2014/0248168 A1* | 9/2014 | Chantriaux | B64D 27/24 |
| | | | 417/410.1 |
| 2017/0058812 A1 | 3/2017 | Park et al. | |
| 2017/0225573 A1 | 8/2017 | Waltner | |
| 2017/0253331 A1 | 9/2017 | Nakashima | |
| 2017/0297679 A1 | 10/2017 | Elliott et al. | |
| 2017/0344026 A1* | 11/2017 | Yang | B64C 39/024 |
| 2017/0349293 A1* | 12/2017 | Klemen | B60L 50/15 |
| 2019/0047720 A1 | 2/2019 | Bosma | |
| 2019/0256202 A1 | 8/2019 | Resnick | |
| 2019/0263519 A1* | 8/2019 | Argus | B64C 39/024 |
| 2020/0039657 A1 | 2/2020 | Ransom et al. | |
| 2021/0316874 A1 | 10/2021 | Resnick et al. | |

OTHER PUBLICATIONS

U.S. Appl. No. 16/215,011 , "Final Office Action", dated Sep. 13, 2021, 26 pages.

U.S. Appl. No. 16/215,011 , "Non-Final Office Action", dated Apr. 14, 2021, 13 pages.

U.S. Appl. No. 17/135,735 , "Notice of Allowance", dated Aug. 30, 2021, 10 pages.

PCT/US2021/065248 , "Invitation to Pay Additional Fees and, Where Applicable, Protest Fee", dated Mar. 1, 2022, 2 pages.

U.S. Appl. No. 17/474,004 , "Non-Final Office Action", dated Jun. 2, 2023, 15 pages.

U.S. Appl. No. 17/787,910 , "Notice of Allowance", dated Aug. 1, 2023, 10 pages.

* cited by examiner

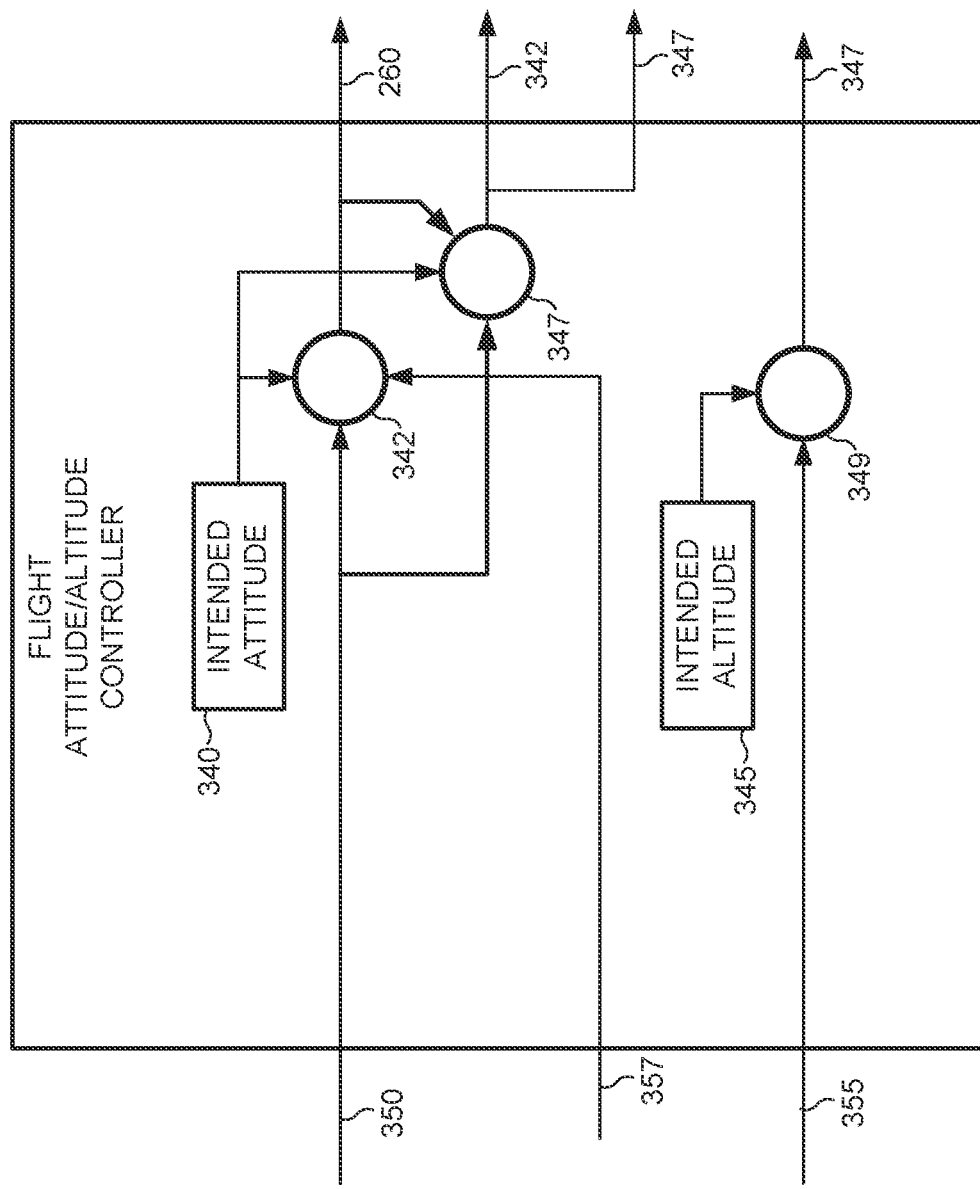

METHOD AND APPARATUS FOR LIFTING A PAYLOAD

RELATED APPLICATIONS

The present application is a continuation of U.S. Non-Provisional application Ser. No. 16/215,011, entitled "A METHOD AND APPARATUS FOR LIFTING A PAYLOAD" by Resnick, which was filed on Dec. 10, 2018, which claims priority to U.S. Provisional Application Ser. No. 62/632,400, entitled "A METHOD AND APPARATUS FOR LIFTING A PAYLOAD" by Resnick, which was filed on Feb. 19, 2018, the disclosures of which are incorporated by reference into this application in their entirety.

BACKGROUND

Hybrid power systems are not new. In fact, many hybrid-powered vehicles are in service on our nation's roads and highways. A hybrid power system relies on the conversion of mechanical power to electrical power. The resulting electrical power is used to power electric motors for propulsion. Any excess electrical power is typically saved in a reservoir, e.g. a battery. Hybrid-powered vehicles may also use regenerative braking so that unwanted momentum can be converted back into electrical power and saved in the reservoir.

Drones are also now using a form of hybrid-power. For example, Phan describes (in published patent application 2016/0137304) a power system where an internal combustion engine (ICE) uses fossil fuel in order to generate mechanical power. The mechanical power is directed to a generator, which converts said mechanical power into electrical power. A portion of the electrical power is used to power electrical motors that are coupled to propellers that affect flight for the droid. Any remaining power is stored in a battery, or is used to power on-board payload components.

The motivation for use of hybrid-power as described by Phan is actually quite obvious. Electrical motors have long been recognized as the best motor structure for use in powering droid propellers. The reason for this is that an electrical motor is much more responsive than an ICE. This higher degree of responsiveness allows better flight control stability since the variation of power applied to various propellers in a multi-rotor aerial vehicle controls yaw, pitch and roll. Use of ICEs for direct drive of propellers fails to support higher dynamics in flight control.

When considering the Phan reference as a whole, there is no added advantage over traditional drone technology expect for the fact that Phan introduces a generator that charges on-board batteries during flight. Phan has increased loft time by providing in-flight charging of batteries. Unfortunately, Phan has compromised the amount of lift available for the payload. This is because the electrical generator and the ICE are simply additional loads that need to be carried by the electrically driven propellers.

BRIEF DESCRIPTION OF THE DRAWINGS

Several alternative embodiments will hereinafter be described in conjunction with the appended drawings and figures, wherein like numerals denote like elements, and in which:

FIG. 16C depicts an alternative embodiment that further includes a gear-box 217, which is disposed to receive mechanical power from the internal combustion engine 210;

FIG. 17C is a block diagram that depicts one alternative example embodiment of a flight controller 300;

DETAILED DESCRIPTION

In the interest of clarity, several example alternative methods are described in plain language. Such plain language descriptions of the various steps included in a particular method allow for easier comprehension and a more fluid description of a claimed method and its application. Accordingly, specific method steps are identified by the term "step" followed by a numeric reference to a flow diagram presented in the figures, e.g. (step 5). All such method "steps" are intended to be included in an open-ended enumeration of steps included in a particular claimed method. For example, the phrase "according to this example method, the item is processed using A" is to be given the meaning of "the present method includes step A, which is used to process the item". All variations of such natural language descriptions of method steps are to be afforded this same open-ended enumeration of a step included in a particular claimed method.

Unless specifically taught to the contrary, method steps are interchangeable and specific sequences may be varied according to various alternatives contemplated. Accordingly, the claims are to be construed within such structure. Further, unless specifically taught to the contrary, method steps that include the phrase " . . . comprises at least one or more of A, B, and/or C . . . " means that the method step is to include every combination and permutation of the enumerated elements such as "only A", "only B", "only C", "A and B, but not C", "B and C, but not A", "A and C, but not B", and "A and and C". This same claim structure is also intended to be open-ended and any such combination of the enumerated elements together with a non-enumerated element, e.g. "A and D, but not B and not C", is to fall within the scope of the claim. Given the open-ended intent of this claim language, the addition of a second element, including an additional of an enumerated element such as "2 of A", is to be included in the scope of such claim. This same intended claim structure is also applicable to apparatus and system claims.

Figure 1:
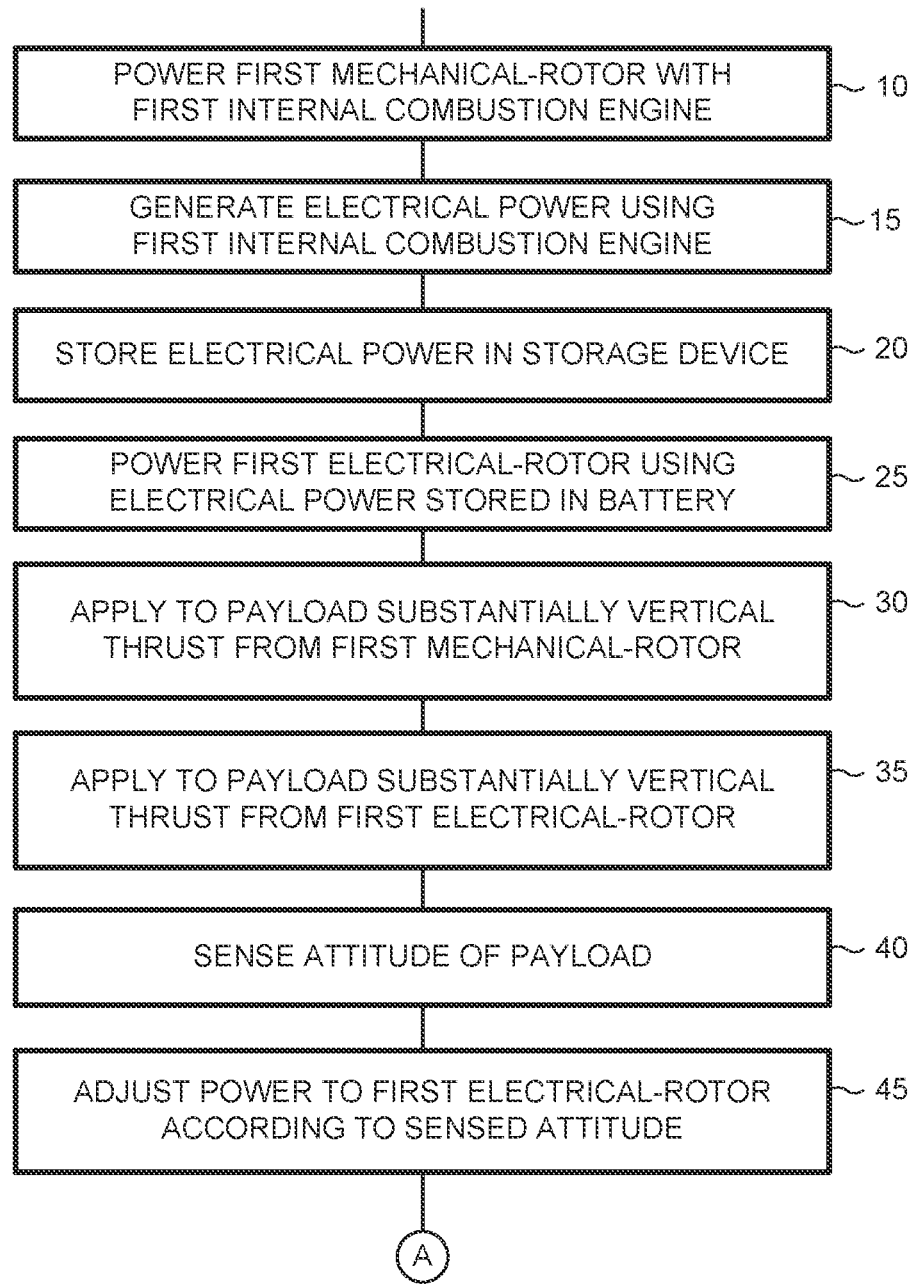
FIG. 1 is a flow diagram that depicts one example method for lifting a payload.

FIG. 1 is a flow diagram that depicts one example method for lifting a payload. According to this example method, lifting a payload comprises the steps of powering a first mechanical-rotor using a first internal combustion engine (step 10); generating electrical power using the first internal combustion engine (step 15); storing the electrical power in an electricity-storage-device (step 20); powering a first electrical-rotor using electrical power stored in the electrical-storage-device (step 25); applying a portion of a thrust generated by the first mechanical-rotor, in a substantially vertical direction, to the payload (step 30); applying a portion of a thrust generated by the first electrical-rotor in a substantially vertical direction, to the payload (step 35); sensing an attitude of the payload (step 40); and adjusting the power to the first electrical-rotor according to the sensed attitude (step 45).

It should be appreciated that, according to this example method, a substantial portion of thrust generated by the first mechanical-rotor is used to lift the payload. According to one illustrative use case, the present example method is applied in a situation where the first mechanical-rotor is affixed to an airframe. In this illustrative use case, a thrust created by the first mechanical-rotor is used to lift the payload, which in turn lifts a payload. It should likewise be appreciated that, according to yet another illustrative use case, there is no specific secondary payload lifted according to this method, rather the payload comprises the airframe itself. According to yet another illustrative use case, the present method is applied in a situation where the first electrical-rotor is attached to the airframe. Accordingly, substantially vertical thrust from the first mechanical-rotor and the first electrical-rotor are used in conjunction to lift a payload. Again, it, should be appreciated that, according to various illustrative use cases, the payload comprises at least one or more of an airframe and/or a secondary payload.

It should likewise be appreciated that, according to this example method, a first mechanical-rotor is a term that is used to refer to a rotor that is driven by a mechanical work derived from a machine that consumes a carbon-based fuel. In one alternative example method, an included step provides for receiving mechanical work from a power source comprising an internal combustion engine ("ICE"). It should likewise be appreciated that, according to one alternative example use case, the first mechanical-rotor comprises a propeller.

It should likewise be appreciated that, according to this example method, a first electrical-rotor is a term used to refer to a rotor that is driven by mechanical work derived from an electrical machine. In one alternative example method, an included step provides for receiving mechanical power from an electrical machine comprising a motor-generator. In one alternative example method, an included step provides for receiving mechanical power from an electrical machine comprising at least one or more of an induction motor-generator and/or a brushless direct current motor-generator. It should also be appreciated that, according to one alternative example use case, the first electrical-rotor comprises a propeller.

It should likewise be appreciated that, according to one alternative example method, mechanical power created by a machine that consumes a carbon-based fuel is converted into thrust by an included step for applying the mechanical power to a propeller.

According to one alternative example method, generating electrical power is accomplished by an included step for receiving mechanical work from a machine that consumes a carbon-based fuel and converting the received mechanical work into electrical energy. According to one illustrative use case, this is accomplished by coupling mechanical work from an internal combustion engine to a motor-generator. In yet another illustrative use case, this is accomplished by coupling mechanical work from an internal combustion engine to an induction motor-generator. In either of these illustrative use cases, rotational work is then converted into electrical energy by at least one or more of the motor-generator and/or the induction motor-generator.

In yet another alternative example method, converting the mechanical work into electrical energy comprises a step for converting the mechanical work into an alternating current. In a subsequent included step, the alternating current is conditioned in order to create a direct current. And in yet another example variation of the present method, a subsequent included step provides for throttling the direct current in order to properly charge an energy-storage-device. According to one illustrative use case, the energy-storagedevice comprises a battery. In yet another illustrative use case, the present method is applied in a situation where the energy-storage-device comprises a "super capacitor". It should be appreciated that the present example method and variations thereof are intended to be applied to a wide variety of illustrative use cases and any particular example of an energy-storage-device is presented herein solely to further enable comprehension of this disclosure by those skilled in the art and is not intended to limit the scope of the claims appended hereto.

Once electrical energy is stored in the electrical-storage-device, one illustrative alternative method comprises a step for drawing electrical energy from the electrical-storage-device and a step for converting the electrical energy into mechanical work. In a subsequent included step, this mechanical work is then converted into thrust. According to yet another alternative example method, converting the mechanical work derived from the electrical energy into thrust is accomplished by an included step for applying the mechanical work to a propeller.

According to yet another alternative example method, sensing an attitude of the payload comprises a step for sensing an attitude of an airframe. It should be appreciated that, according to various illustrative use cases, the airframe comprises the payload. It should likewise be appreciated that, according to various alternative example methods, sensing an attitude of the payload comprises sensing the angular rotation of the payload in at least one axis.

According to one alternative example method, sensing an attitude of the payload comprises a step for sensing the angular rotation of the payload about an axis of pitch, a further step for sensing the angular rotation of the payload in about an axis of yaw, and a further step for sensing the angular rotation about an axis of roll, wherein the terms pitch, yaw and roll refer to standard axis definitions in aeronautical engineering. It should be appreciated that, according to one alternative example method, sensing and angular rotation is accomplished by applying an accelerometer to the airframe and receiving an acceleration signal from the accelerometer. In yet another alternative example method, three such accelerometers are attached to the airframe. It should be appreciated that, according this alternative example method, one accelerometer is disposed to sense angular rotation about the axis of pitch, one accelerometer is disposed to sense angular rotation about the axis of yaw and another accelerometer is disposed to sense angular rotation about the angle of role.

It should be appreciated that, according to various illustrative use cases, the present method is applied in a manner where angular acceleration signals for pitch, yaw and roll are processed in order to ascertain changes in the attitude of the payroll, for example the airframe itself. In one alternative example method, an additional included step provides for using such changes in attitude in order to return the airframe to an initial attitude state. This, according to one alternative example method, provides for an included step for engaging a control loop wherein changes in attitude are used as feedback in a control system for controlling thrust applied to the payload. According to this example method and variations thereto, the control system adjusts the power to the first electrical-rotor in order to maintain the payload in a steady attitude state.

Figure 2:
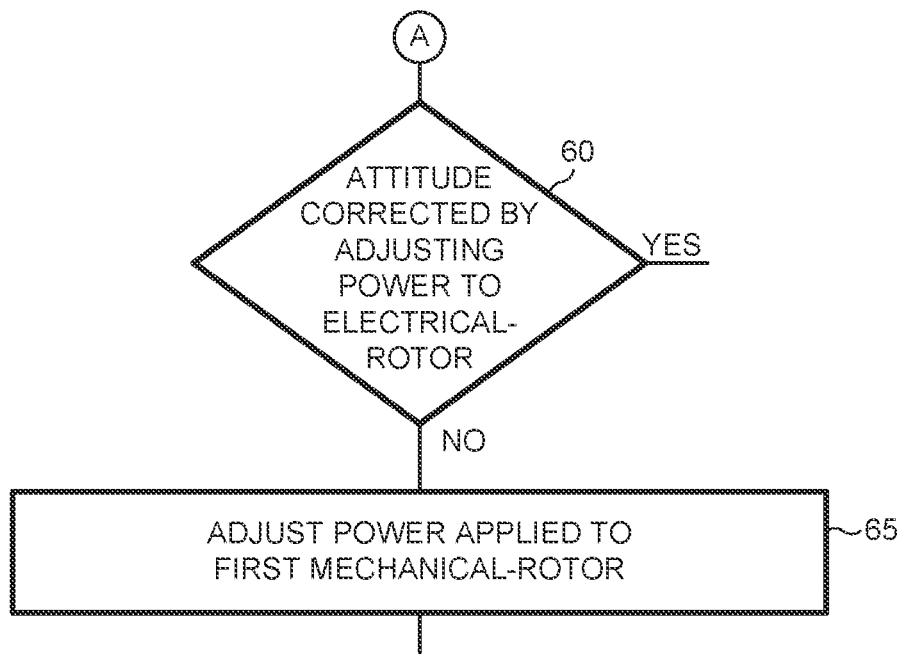
FIG. 2 is a flow diagram that depicts one alternative example method wherein attitude adjustment is further accomplished by application of thrust generated by a mechanical-rotor.

FIG. 2 is a flow diagram that depicts one alternative example method wherein attitude adjustment is further accomplished by application of thrust generated by a mechanical-rotor. It should be appreciated that, according to the example method herein described, adjustment of payload attitude in response to a sensed changes thereto is accomplished by adjusting the power to the first electrical-rotor. It should be appreciated that the electrical-rotor is utilized for principal attitude adjustment because of the response of nature of an electrical-rotor when compared to a mechanical-rotor. The reason for this is that the electrical-rotor is driven by a machine powered by electrical power, whereas the mechanical-rotor is driven by a machine that consumes fossil fuel. It should likewise be appreciated that the angular velocity of the electrical-rotor may be changed at a much greater rate when compared to the mechanical-rotor. Hence, one exciting aspect of the present method is refined attitude adjustment capability provided by the electrical-rotor.

There are, however, situations where the thrust provided by the electrical-rotor is not sufficient to maintain steady-state attitude. This, according to various illustrative use cases, occurs when the payload is not evenly distributed among several rotors operating in conjunction with each other to provide the lift necessary to carry the payload. Accordingly, when the attitude of the payload cannot be corrected by adjusting the power to the electrical-rotor (step 60), then the power applied to the first mechanical-rotor is also adjusted (step 65) in order to augment the thrust necessary to maintain steady-state attitude of the payload.

Figure 3:
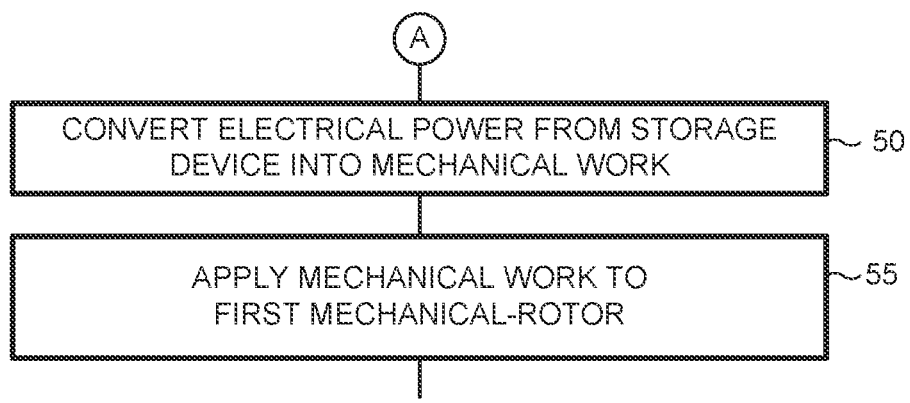
FIG. 3 is a flow diagram that depicts one alternative example method that further allows for ancillary power to be applied to the first mechanical-rotor.

FIG. 3 is a flow diagram that depicts one alternative example method that further allows for ancillary power to be applied to the first mechanical-rotor. Referring briefly to FIG. 16B, a first mechanical rotor 225, according to one illustrative embodiment of the present method, is driven by a first internal combustion engine 210. It should be appreciated that, according to this illustrative embodiment, the first internal combustion engine 210 also drives a first motor-generator 220. It should be appreciated that, according to this alternative example method, electrical power stored in the electricity-storage-device is converted into mechanical work (step 50).

According to the illustrative embodiment of this alternative method, this is accomplished by applying the electrical power to the first motor-generator 220. Once the electrical power is converted into mechanical work, the mechanical power is then applied to the first mechanical-rotor (step 55), in conjunction with any mechanical power developed by the first ICE 80. In this manner, additional thrust is generated by mechanical power in order to provide auxiliary lift capacity for a payload. This additional thrust, according to other illustrative use cases, is applied in situations where additional thrust is necessary to maintain the attitude of the payload in a steady-state condition. This additional thrust, according to yet other illustrative use cases, is applied in situations where additional thrust is necessary to maintain or change the altitude of the payload in a steady-state condition.

Figure 4:
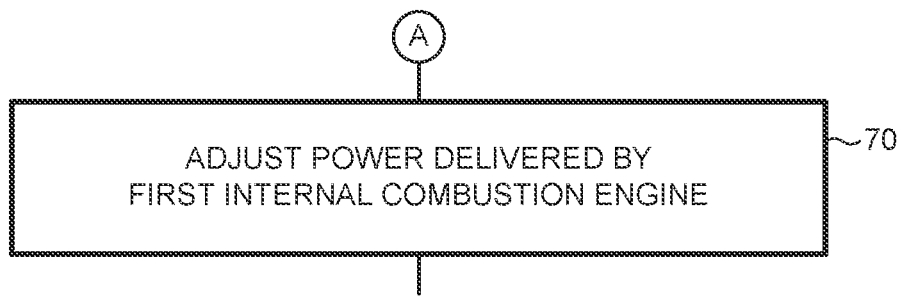
FIG. 4 is a flow diagram that depicts one alternative example method for increasing the altitude of the payload.

FIG. 4 is a flow diagram that depicts one alternative example method for increasing the altitude of the payload. It should be appreciated that, according to the example method herein described, the "heavy lifting" of a payload is accomplished by one or more a mechanical-rotors. As heretofore described, the mechanical-rotors are driven by machines that consume fossil fuel, for example an ICE. Accordingly, one alternative example method provides an included step for adjusting the power delivered by the first internal combustion engine. By adjusting the power delivered by the first internal combustion engine, the vertical thrust applied to the payload is increased, thereby effecting increasing the altitude of the payload.

Figure 5:
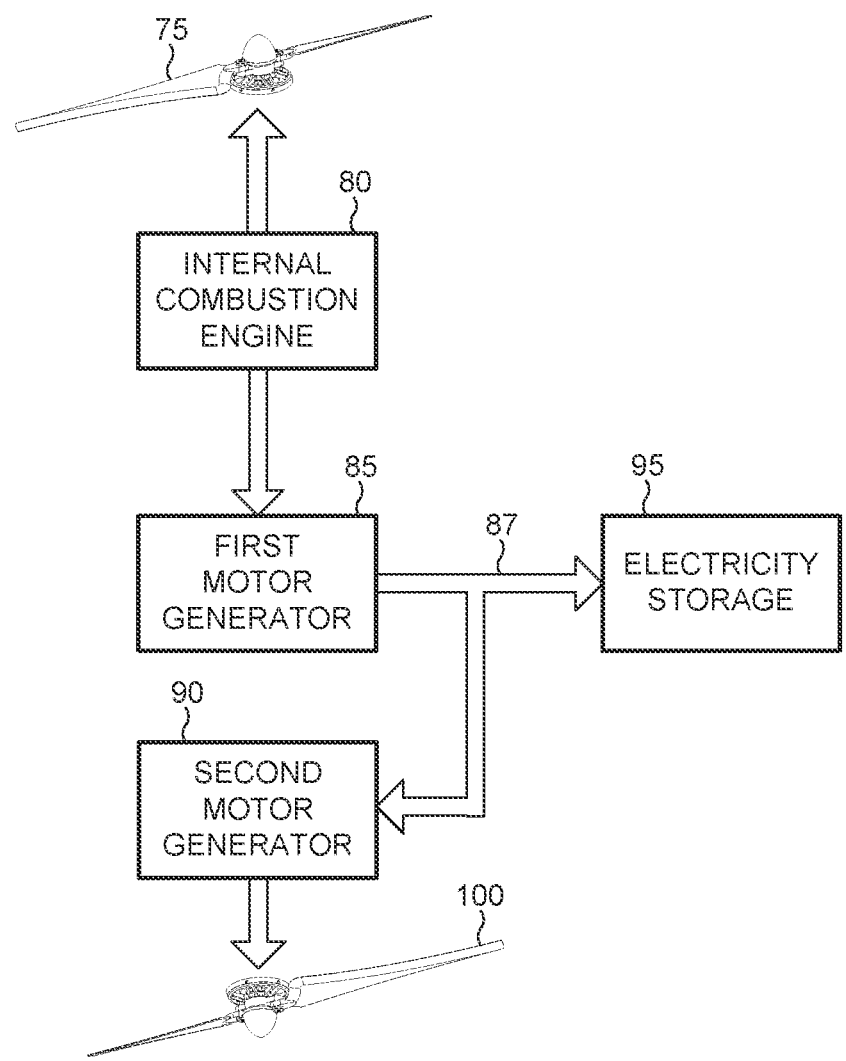
FIG. 5 is a pictorial diagram that depicts the operation a dual-rotor embodiment of the present method.

FIG. 5 is a pictorial diagram that depicts the operation of a dual-rotor embodiment of the present method. According to one dual-rotor embodiment of the present method, a first mechanical-rotor 75 is driven by a first internal combustion engine 80. It should be appreciated that, according to this illustrative embodiment of the present method, the first internal combustion engine 80 also drives a first motor-generator 85. In operation, the first internal combustion engine 80 provides mechanical power to the first mechanical-rotor 75, which in one alternative embodiment comprises a propeller. An additional portion of mechanical power generated by the internal combustion engine 80 is converted into electrical power 87 by the first motor-generator 85. It should be appreciated that a shaft included in the motor-generator 85 runs through to the other end of the motor-generator 85. This means that mechanical power is conveyed via this shaft from the ICE 80 through to the mechanical-rotor 75.

As this example embodiment of the present method continues to operate, a portion, if not all of the electrical power 87 is then stored in an electricity-storage-device 95. Electric power 87 stored in the electricity-storage-device 95 is then used to power a second motor-generator 90. The second motor-generator 90 then operates a rotor, which according to one alternative embodiment comprises a propeller. In the descriptions herein offered regarding the present method and variations thereto, this second motor-generator 90 drives the first electric-rotor referenced herein with respect to the claims. Readers are cautioned not to confuse this nomenclature with nomenclature used to describe various apparatus that embody the present method and variations thereof.

Figure 6:
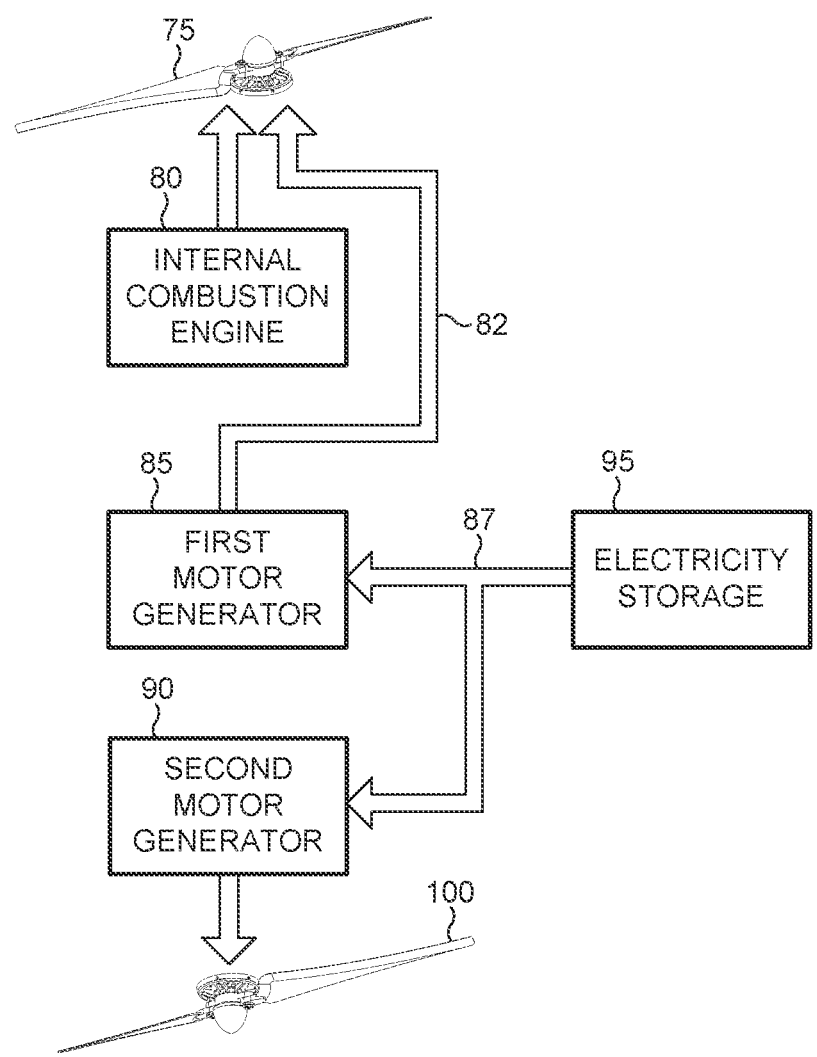
FIG. 6 is a pictorial diagram that depicts operation of one alternative example embodiment of the present method wherein electrical power is used to augment the amount of mechanical work applied to a mechanical-rotor.

FIG. 6 is a pictorial diagram that depicts operation of one alternative example embodiment of the present method wherein electrical power is used to augment the amount of mechanical work applied to a mechanical-rotor. Again referencing FIG. 21, the first internal combustion engine 80 is coupled to the first mechanical-rotor 75 and to the first motor-generator 85. Coupling of the first internal combustion engine 82 both the first mechanical-rotor 75 and to the first motor-generator 85 means that the first motor-generator 85 is also coupled to the first mechanical-rotor 75.

As this alternative example embodiment of the present method continues to operate, electrical power 87, upon necessity for additional thrust from the first mechanical-rotors 75, is directed to the first motor-generator 85. The first motor-generator 85 converts the electrical power 87 into mechanical work 82, which is also applied to the first mechanical-rotor 75.

Figure 7:
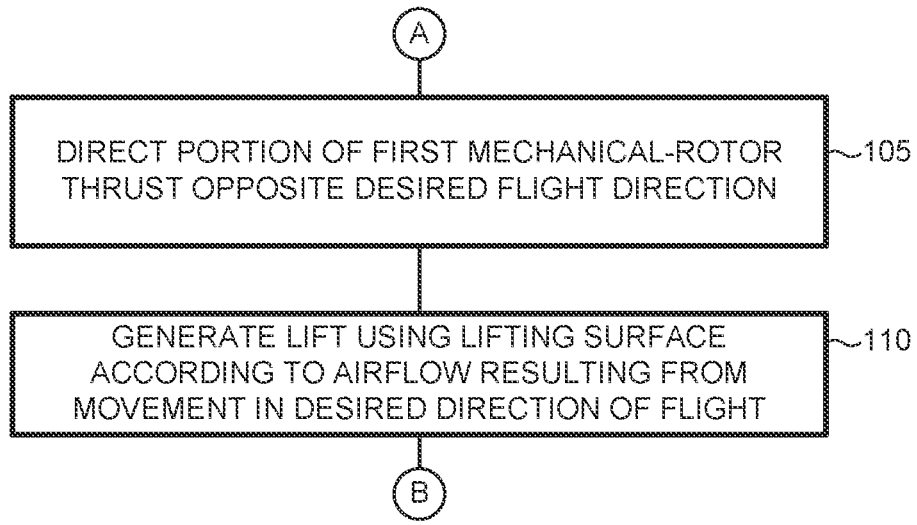
FIG. 7 is a flow diagram that depicts one alternative example method that provides for more efficient movement of a payload from one location to another.

FIG. 7 is a flow diagram that depicts one alternative example method that provides for more efficient movement of a payload from one location to another. It should be appreciated that the use of vertical thrust to maintain lift necessary to move a payload is a generally inefficient process. Accordingly, this example variation of the present method provides for an included step for directing an additional portion of the thrust generated by the first mechanical-rotor in a direction opposite to that of a desired flightpath (step 105). Accordingly, as a portion of the thrust generated by the first mechanical-rotor is diverted from a substantially vertical orientation toward a direction that is substantially opposite to a direction of flight, lift is generated as air flows across a lifting surface (step 110), which is an additional included step of this variation of the present method.

It should be appreciated that, according to various illustrative use cases, this variation of the present method provides for a transition from vertical suspension using substantially vertical thrust to a forward-flight mode. As can be appreciated, the first mechanical-rotor, in order to support this variation of the present method, is adjusted so as to tilt the orthogonal axis of the rotor from a substantially vertical orientation toward a horizontal orientation. It should likewise be appreciated that such reorientation of the first mechanical-rotor is not intended to be accomplished instantaneously. Rather, a gradual reorientation provides that forward-flight is initiated so that lift is generated using a lifting surface, which according to one illustrative use case comprises an airfoil. According to yet another illustrative use case, the lifting surface comprises an aeronautical wing.

It is important to appreciate that as the direction of thrust generated by the first mechanical-rotor is adjusted in this manner, the lift provided by the first mechanical-rotor is reduced as the payload increases in speed so as to generate lift as air flows across the lifting surface. At some point, a substantial portion of the thrust generated by the first mechanical-rotor is oriented in a direction opposite to that of a desired direction of flight. Accordingly, lift to maintain elevation of the payload is generated substantially by the lifting surface as heretofore described.

Figure 8:
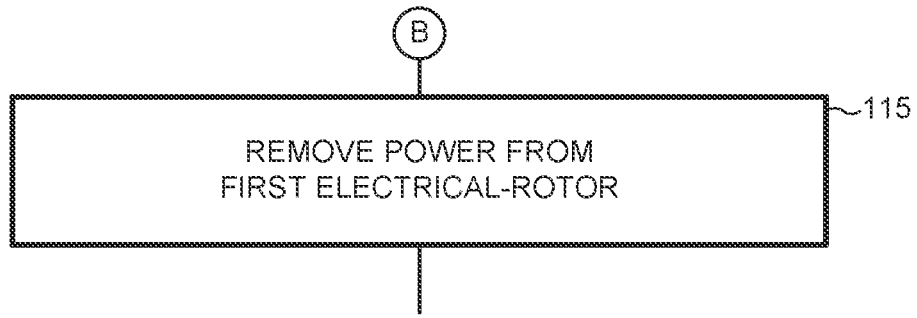
FIG. 8 is a flow diagram that depicts yet another variation of the present method which provides for greater efficiency after the payload has been transitioned into a forward-flight mode.

FIG. 8 is a flow diagram that depicts yet another variation of the present method which provides for greater efficiency after the payload has been transitioned into a forward-flight mode. This variation of the present method provides an included step for removing power from the first electrical-rotor (step 115) once the payload has achieved forward-flight. It should be appreciated that once forward-flight is achieved, any rotor that continues to be oriented such that is orthogonal axis is perpendicular to the direction of forward-flight will cause instability and/or additional resistance (e.g. drag) to forward-flight. By removing power from the first electrical-rotor, the first electrical-rotor, according to one illustrative use case, will naturally orient itself in a manner that minimizes instability and additional resistance to forward-flight. In yet another illustrative use case, an electrical rotor (e.g. a propeller) may not orient itself in a suitable position. Accordingly, one alternative variation of the present method further includes a step for detecting the orientation of the first-electrical rotor and applying electrical power to the first electrical-rotor in order to maintain the position of that rotor so as to minimize instability and resistance to forward-flight.

Figure 9:
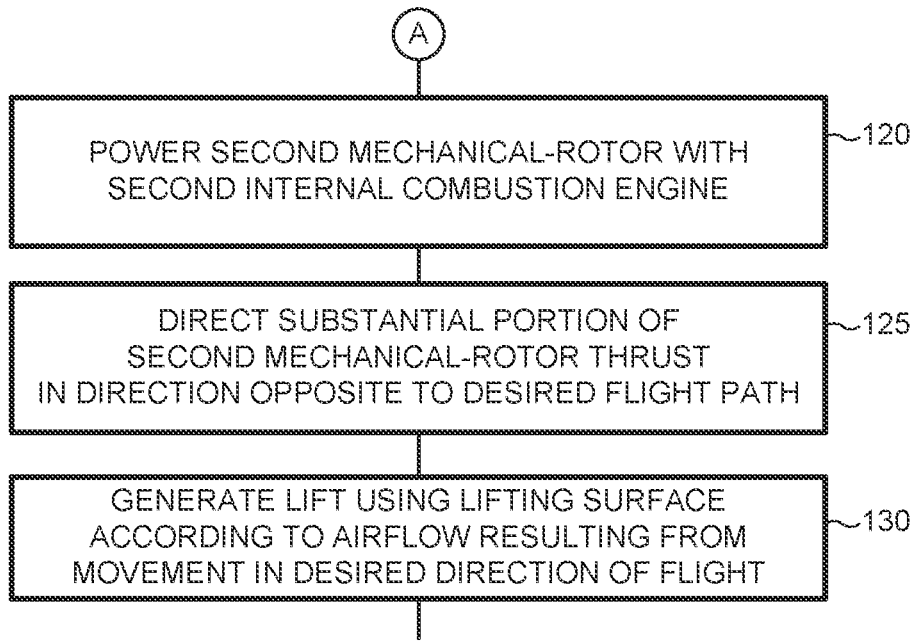
FIG. 9 is a flow diagram that depicts one alternative variation of the present method where in forward-flight is achieved using a fixed rotor.

FIG. 9 is a flow diagram that depicts one alternative variation of the present method where in forward-flight is achieved using a fixed rotor. It should likewise be appreciated that, according to one variation of the present method, forward-flight is achieved by applying thrust generated by a second mechanical-rotor which is powered by a second internal combustion engine (step 120), which is an included step in this variation of the present method. According to another included step of this variation of the present method, a substantial portion of the thrust generated by the second mechanical-rotor is directed in a direction opposite to that of a desired flightpath (step 125). It should be appreciated that, an additional included step provides for generating lift using a lifting surface as air flows across the lifting surface (step 130). It should likewise be appreciated that as airflow across the lifting service increases, so does the lift necessary for maintaining altitude for a payload.

It should likewise be appreciated that, according to yet another variation of the present method, forward-flight is achieved by applying thrust generated by a second electrical-rotor. According to one illustrative use case, this variation of the present method is applied in a situation where a second electrical-rotor is fixed in an orientation to enable thrust in a direction opposite to that of a direction of desired flight. Accordingly, as the second electrical-rotor operates, thrust generated thereby is used to increase the speed of the payload so as to generate lift by means of a lifting surface. It should likewise be appreciated that, these variations of the present method, according to various illustrative use cases, are applied to a payload through an intermediary airframe. As heretofore described, the intermediary airframe is included in one illustrative use case. In yet another illustrative use case, the intermediary airframe is used to carry a secondary payload. In all such illustrative use cases, the present method and variations thereof is intended to encompass all applications where forward-flight is achieved through the use of a fixed rotor, including at least one or more of a second mechanical-rotor and/or a second electrical-rotor.

Figure 10:
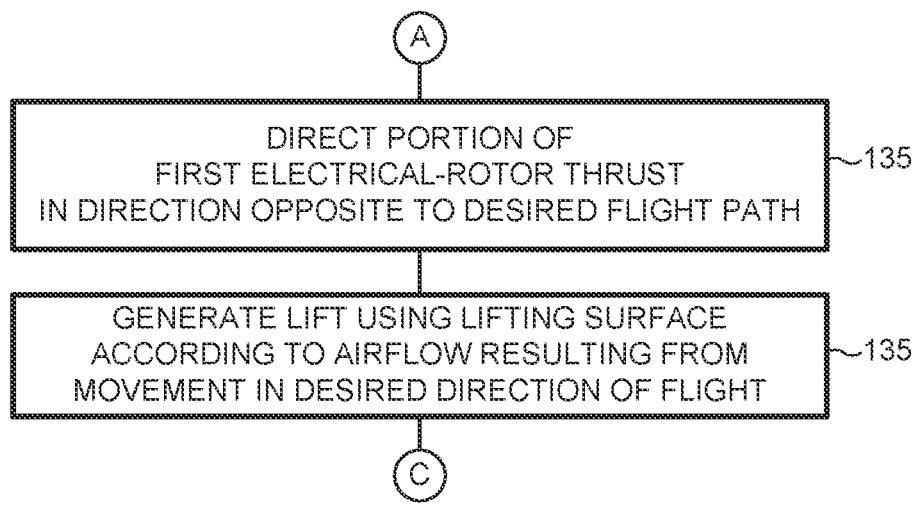
FIG. 10 is a flow diagram that depicts one alternative example variation of the present method where in forward-flight is achieved by using the first electrical-rotor.

FIG. 10 is a flow diagram that depicts one alternative example variation of the present method where in forward-flight is achieved by using the first electrical-rotor. As heretofore described, one alternative variation of the present method provides for tilting the first mechanical-rotor in order to direct a portion of its thrust in a direction opposite to that of a desired flight path. This alternative variation of the present method includes a step for directing a portion of the thrust generated by the first electrical-rotor in a direction opposite to that of a desired flightpath (step 135). Accordingly, lift is generated by a lifting surface once airflow across that lifting surface increases sufficiently as a result of forward-flight (step 135), which is another included step in this example variation of the present method.

It should be appreciated that, much akin to the alternative method which relies upon tilting the first mechanical-rotor in order to achieve forward-flight, this example variation of the present method provides that the first electrical-rotor is tilted in a gradual manner so that a portion of the thrust generated by the first electrical-rotor continues to provide lift to maintain altitude for the payload. As the first electrical-rotor is further tilted, a greater portion of the thrust generated thereby is used to move the payload forward in order to achieve fixed-wing flight. It should likewise be appreciated that, according to one illustrative use case, the lifting surface relied upon by this example variation of the present method comprises at least one or more of an aeronautical wing and/or an airfoil.

Figure 11:
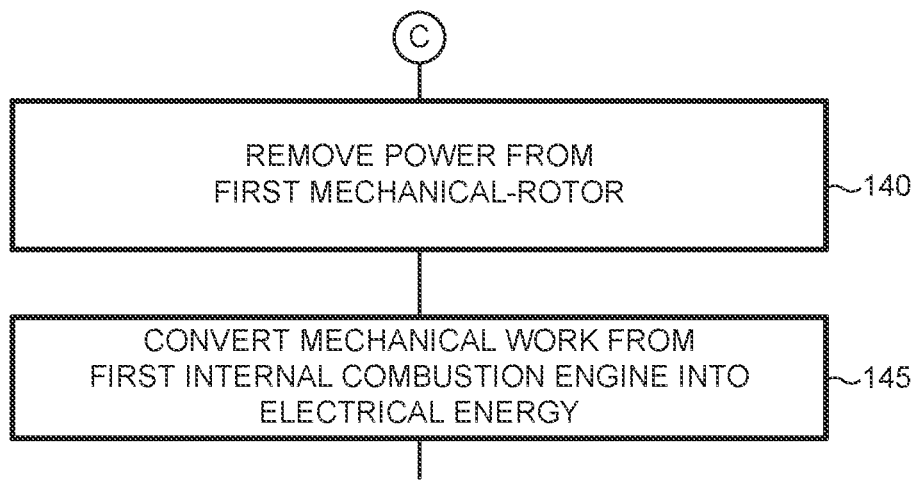
FIG. 11 is a flow diagram that depicts one alternative example method wherein electrical power is generated by a first internal combustion engine for use by an electrical-rotor as the electrical-rotor is used to enable forward-flight.

FIG. 11 is a flow diagram that depicts one alternative example method wherein electrical power is generated by a first internal combustion engine for use by an electrical-rotor as the electrical-rotor is used to enable forward-flight. As heretofore described, one alternative variation of the present method provides for tilting the electrical-rotor in a manner so as to cause thrust from the first electrical-rotor to be redirected from a substantially vertical direction to a substantially horizontal direction in order to achieve forward-flight. As also described, a rotor that continues to operate and provide thrust in a vertical direction when other rotors are used to maintain forward speed in support of fixed-wing flight, such vertically operating rotors are likely to induce instability in flight and create additional resistance to forward motion.

This example variation of the present method provides an included step for removing power from the first mechanical-rotor (step 140). Again to the operation of an electrical-rotor that would otherwise deliver thrust in a substantially vertical direction, removing power from the first mechanical-rotor reduces the likelihood that the first mechanical-rotor will induce flight instability and reduces the likelihood that it will create additional resistance to forward motion. However, it should be appreciated that the first mechanical-rotor is operated by a first internal combustion engine. In the various alternative methods herein described, an internal combustion engine is used to generate electrical energy necessary to operate the electrical-rotors. Accordingly, this alternative example variation of the present method includes a step for conferring mechanical work from the first internal combustion engine into electrical energy (step 145). Put plainly, the first internal combustion engine, according to this alternative example variation of the present method, continues to operate in order to generate said electrical power.

According to one illustrative use case, removing power from the first mechanical-rotor is achieved by means of an apparatus such as a clutch. By opening the clutch, mechanical power from the first internal combustion engine is disengaged from the first mechanical-rotor. However, the first internal combustion engine continues to provide mechanical power to a first motor-generator, which is coupled to the first internal combustion engine, at least according to this illustrative use case.

Figure 12A:
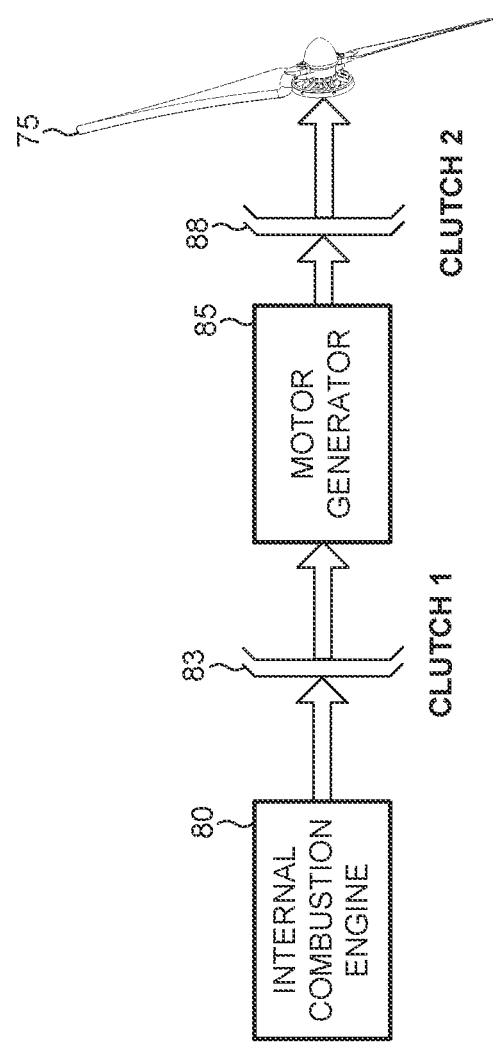
FIG. 12A is a pictorial diagram that illustrates various embodiments of the present method and variations thereof that incorporate mechanical power engagement devices.

FIG. 12A is a pictorial diagram that illustrates various embodiments of the present method and variations thereof that incorporate mechanical power engagement devices. It should be appreciated that, as described above, there is at least one situation where mechanical power is removed from a mechanical-rotor 75 so that a particular internal combustion engine 80 is allowed to operate in order to provide mechanical work to a motor-generator 85. It should likewise be appreciated that there are other situations where mechanical engagement/disengagement of mechanical power from the internal combustion engine 80 provides for alternative use scenarios, including recovery from various failure scenarios. These will be discussed with reference to the table presented immediately below.

| Propeller | M/G | ICE | OPERATING MODE | CLUTCH 1 | CLUTCH 2 |
|---|---|---|---|---|---|
| RUN | G | ON | (1) Thrust/Generating | DIRECT | DIRECT |
| RUN | G | OFF | Not Applicable | | |
| RUN | M | ON | (2) Peak Thrust/Start ICE | DIRECT | DIRECT |
| RUN | M | OFF | (3) Flame Out | OPEN | DIRECT |
| STOP | G | ON | (4) No Thrust/Generating | CLOSED | OPEN |
| STOP | G | OFF | Not Applicable | | |
| STOP | M | ON | (5) Start ICE/No Thrust | CLOSED | OPEN |
| STOP | M | OFF | Not Applicable | | |

Referring to the table immediately above, the status of the propeller is expressed in one of two states including "run" and "stop". The state of the motor-generator ("M/G") is expressed in one of two states including "motor" and "generate". The state of the ICE is expressed in one of two states including "on" and "off". The state of a particular clutch, if included in a particular embodiment described herein, is expressed in two states including "open" and "closed". The open state of a clutch corresponds to a state where the clutch is disengaged and does not transmit mechanical power from input to output of the clutch. The closed state of the clutch corresponds to a state where the clutch is engaged and transmits mechanical power from its input to its output. The table above also defines that a particular clutch is not provided in a particular embodiment of the example method and variations thereof as described below.

It should likewise be appreciated that, as illustrated in FIG. 12A, one particular embodiment of the present example method and variations thereof does not include either a first clutch 83 or a second clutch 88. In this embodiment, the internal combustion engine 80 is directly coupled to the motor-generator 85 and directly coupled to the mechanical-rotor 75. It should be appreciated that, as defined in the table above, such direct coupling of mechanical power from the internal combustion engine 80 to the motor-generator 85 and to the mechanical-rotor 75 supports an illustrative use case (operating mode 1 in the table) wherein propeller is spinning (i.e. it is in a "run" state) and the motor-generator 85 is operating as a generator ("G").

This particular embodiment where the internal combustion engine 80 is directly coupled to the motor-generator 85 and to the mechanical-rotor 75 also supports an illustrative use case (operating mode 2 in the table) where the motor-generator 85 is operating as a motor ("M"). When the motor-generator 85 is operating as a motor, this illustrative use case provides for a situation where the motor is used to initially start the internal combustion engine 80 and to provide additional mechanical power to the mechanical-rotor 75.

According to yet another alternative example embodiment of the present example method and variations thereof, a first clutch 83 is included and is disposed between the internal combustion engine 80 and the motor-generator 85. In this alternative example embodiment, the motor-generator 85 is directly coupled to the mechanical-rotor 75. This particular embodiment supports an illustrative use case (operating mode 3 in the table) wherein the first clutch 83 is opened in the event of a flameout of the internal combustion engine 80. In this state, the ICE is off and the motor-generator operates as a motor ("M") in order to provide mechanical power to the mechanical-rotor 75.

According to yet another alternative example embodiment of the present example method and variations thereof, a first clutch 83 and a second clutch 88 are both included in the embodiment of an ICE power unit ("ICE/PU"). It should be appreciated that an ICE/PU includes the internal combustion engine 80 the motor-generator 85 and mechanical-rotor 75. Because this alternative example embodiment includes both the first clutch 83 and the second clutch 88, this embodiment supports additional illustrative use cases, which are identified as functions 4 and 5 in the table above.

According to the first additional illustrative use case (operating mode 4), the internal combustion engine 80 is operated in order to provide mechanical work to the motor-generator 85 when the first clutch 83 is closed. In this illustrative use case, the second clutch 88 is opened so that mechanical powers not delivered to the mechanical-rotor 75, for example in those situations where forward-flight has been achieved and the mechanical-rotor is disengaged so that it does not impede such forward-flight.

According to the second additional illustrative use case (operating mode 5), the first clutch 83 is closed and the second clutch 88 is open. According to this illustrative use case, the motor-generator 85 is used to start the internal combustion engine 80 without providing mechanical work to the mechanical-rotor 75. It should be appreciated that this is an important feature because, in some illustrative use cases, it is important to start the internal combustion engine 80 without engaging the mechanical-rotor 75, which would otherwise pose a hazard to personnel safety.

Figure 12B:
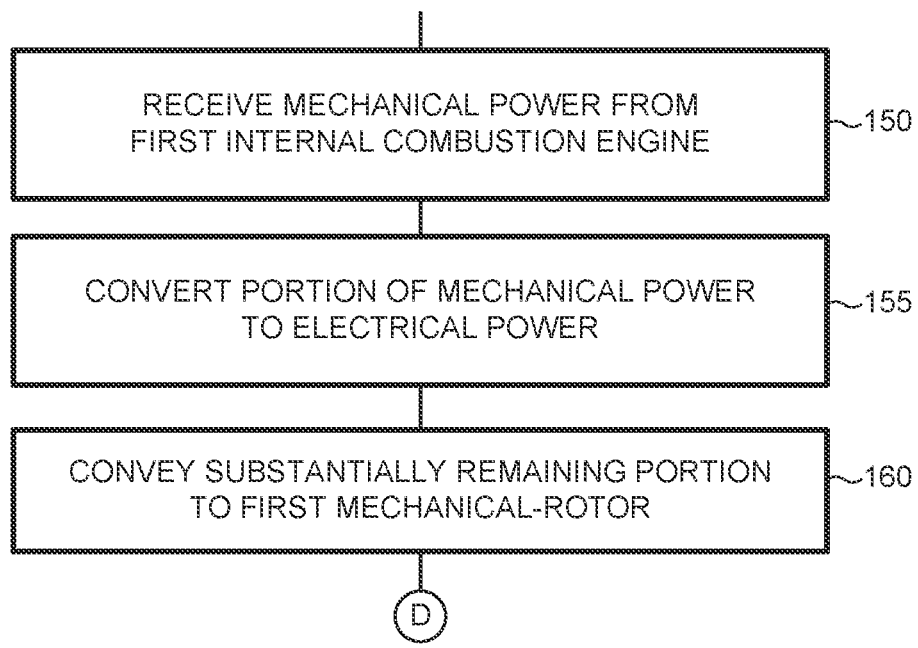
FIG. 12B is a flow diagram that depicts one alternative example method wherein electrical power is generated based upon consumption of a fossil fuel.

FIG. 12B is a flow diagram that depicts one alternative example method wherein electrical power is generated based upon consumption of a fossil fuel. According to this alternative example method, generating electrical power comprises a step for receiving mechanical power from the first internal combustion engine (step 150); converting a portion of the mechanical power to electrical power (step 155); and conveying a substantially remaining portion of the mechanical power to the first mechanical-rotor (step 160).

It should be appreciated that, according to one illustrative use case, this alternative example method is embodied in a machine that includes an internal combustion engine that is coupled to a motor-generator and to a mechanical-rotor, as heretofore described. Accordingly, mechanical work from the internal combustion engine is delivered to the motor-generator, which converts the mechanical work into electrical power. The remaining mechanical work from the internal combustion engine is then directed to the mechanical-rotor. Additional embodiments of apparatus that apply this variation of the present method are described further, below.

Figure 12C:
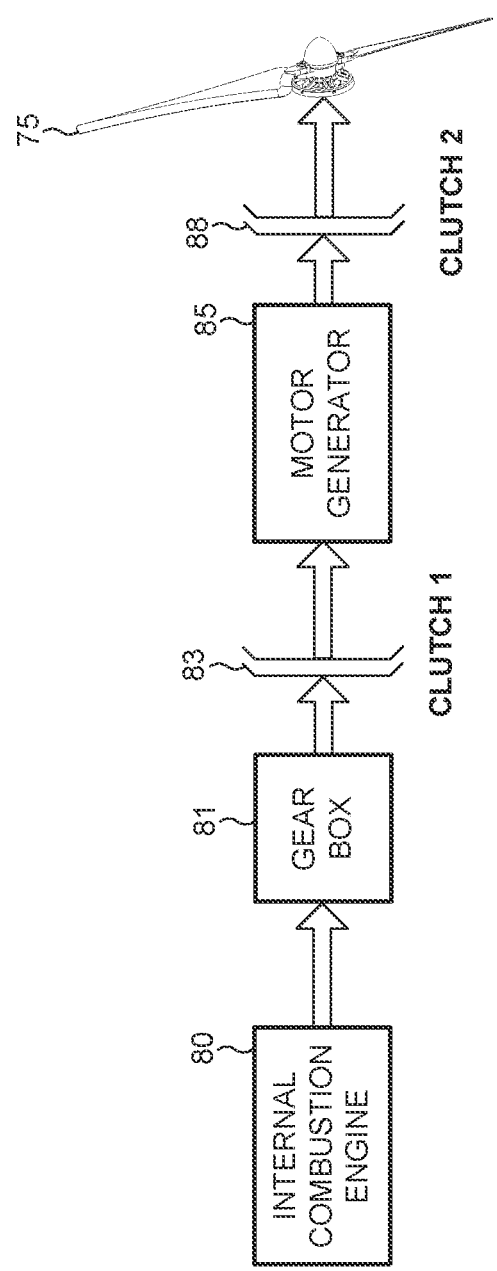
FIG. 12C is a pictorial diagram that illustrates one alternative illustrative use case of the present method and variations thereof that incorporate mechanical power engagement devices and a speed-altering device.

FIG. 12C is a pictorial diagram that illustrates one alternative illustrative use case of the present method and variations thereof that incorporate mechanical power engagement devices and a speed-altering device. As described above with support from FIG. 12A, an internal combustion engine 80 is used to provide mechanical power to the mechanical-rotor 75. In this alternative illustrative use case of the present method, the mechanical power provided by the ICE 80 is first subject to a speed-alteration, which is accomplished by means of a gear box 81.

In yet another alternative use case of the present method, the gear box reduces the rotational speed of the mechanical power received from the ICE 80. The power, at a reduced rotational speed, is presented to the first clutch 83. The power from the first clutch 83 then is directed to a motor-generator 85. The reduced rotational-speed power from the motor-generator is then directed to a second clutch 88, and from the second clutch 88 to the mechanical-rotor 75.

Figure 12D:
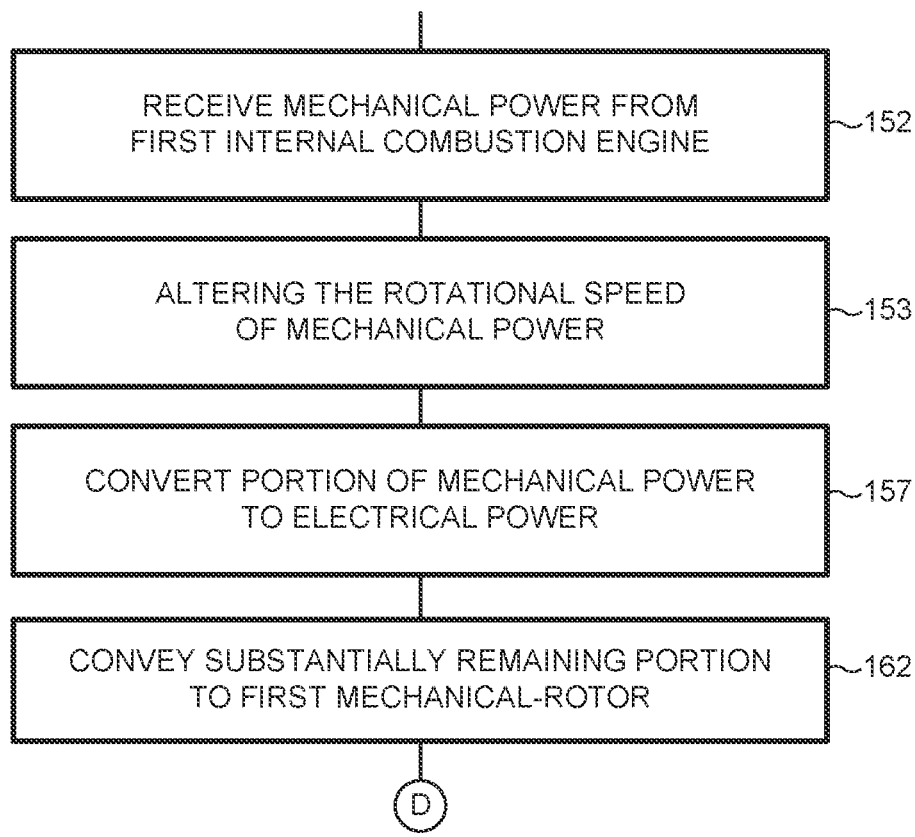
FIG. 12D is a flow diagram that depicts one alternative method where the efficiency of an ICE is accommodated at different rotational speeds.

FIG. 12D is a flow diagram that depicts one alternative method where the efficiency of an ICE is accommodated at different rotational speeds. It should be appreciated that different ICEs exhibit varying efficiencies at varying rotational speeds. For example, where one model of an ICE exhibits greater efficiency at a higher rotational speed than a second ICEs model. In other illustrative use cases, a motor-generator exhibits peak efficiency at a different rotational rate than a particular ICEs. In order to operate at maximum system efficiency, a conversion of rotational speed is performed in order to match the efficiency of a particular IECs to a particular motor generator.

Accordingly, one alternative example method provides included steps for receiving mechanical power from an internal combustion engine (step 152), altering the rotational rate of the mechanical power (step 153), converting a portion of the rotational-rate-adjusted mechanical power to electrical power (step 157) and then conveying the remaining rotational-rate-adjusted mechanical power to a first mechanical-rotor (step 162).

It should be appreciated that different propellers exhibit varying efficiencies at varying rotational speeds. In other illustrative use cases, propellers exhibit peak efficiency at a different rotational rate than a particular motor-generator. In order to operate at maximum system efficiency, a conversion of rotational speed is performed in order to match the efficiency of a particular IEC to a particular motor generator.

Accordingly, one alternative example method provides included steps for receiving mechanical power from an internal combustion engine (step 152), altering the rotational rate of the mechanical power (step 153), converting a portion of the rotational-rate-adjusted mechanical power to electrical power (step 157) and then conveying the remaining rotational-rate-adjusted mechanical power to a first mechanical-rotor (step 162).

Figure 13:
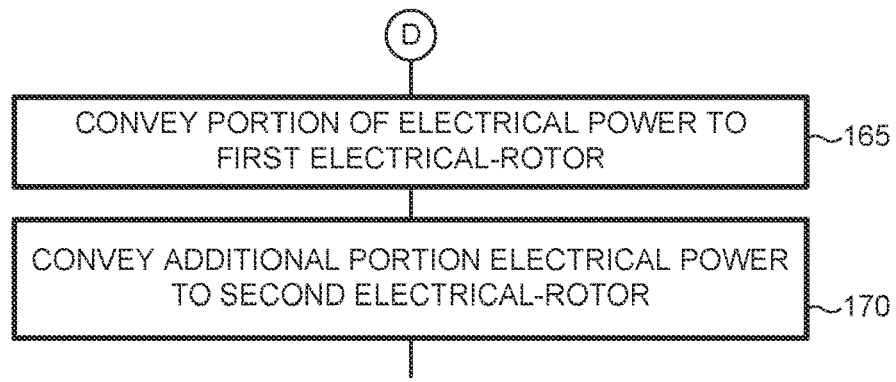
FIGS. 13 through 15 are flow diagrams that depict alternative example methods for managing electrical power produced by a machine that consumes a fuel.
Figure 14:
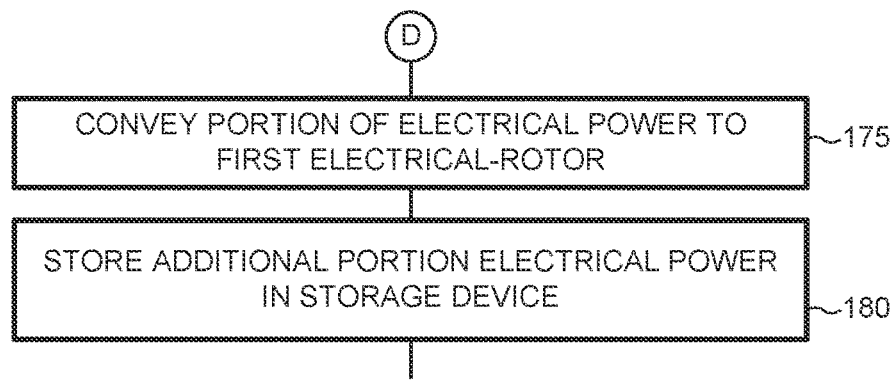
Figure 15:
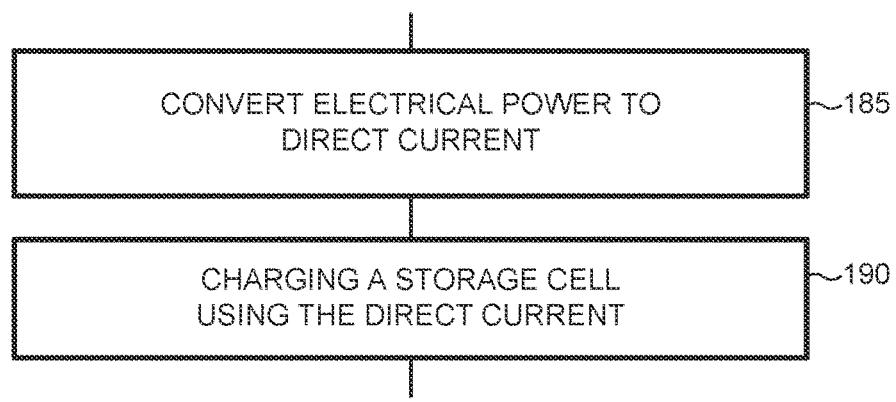

FIGS. 13 through 15 are flow diagrams that depict alternative example methods for managing electrical power produced by a machine that consumes a fuel. According to one variation of the present method, a portion of the electrical power generated by a first internal combustion engine is directed to a first electrical-rotor (step 165), which is an further included step in this variation of the present method. This variation of the present method further includes a step for conveying an additional portion of the electrical power to a second electrical-rotor (step 170). It should be appreciated that this variation of the present method provides for operating additional electrical-rotors from electrical power generated by a single internal combustion engine.

According to yet another example variation, the present method further includes a step for conveying a portion of the electrical power to a first electrical-rotor (175) and storing an additional portion of the electrical power for future use (step 180). It should likewise be appreciated that, according to this variation of the present method, electrical power is stored in electrical storage device. According to one illustrative use case, the present method is applied in conjunction with the use of a battery for storing electrical power generated by the first internal combustion engine.

And in yet another example variation of the present method, an additional further step is included for converting the electrical power to a direct current (step 185) and then charging a storage cell according to the direct current (step 190). According to some illustrative use cases, the various example methods herein described are applied in conjunction with an induction machine, which is used to generate electrical power. The output of the induction machine, which produces an alternating current, is converted to direct current and regulated in order to charge a storage cell, which according to various illustrative use cases comprises a battery.

Figure 16A:
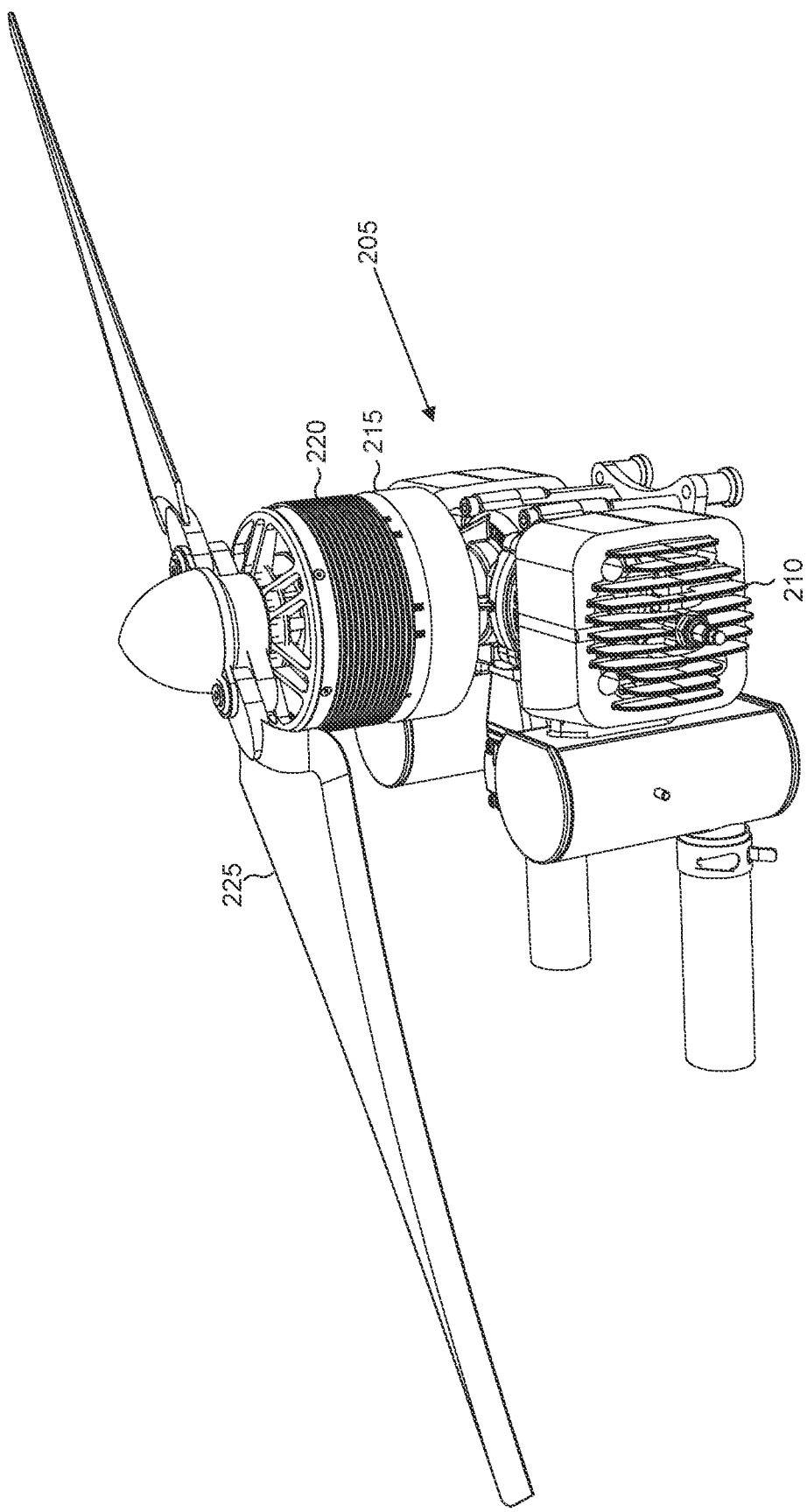
FIG. 16A is a pictorial diagram that illustrates one example embodiment of an internal combustion engine power unit.
Figure 16B:
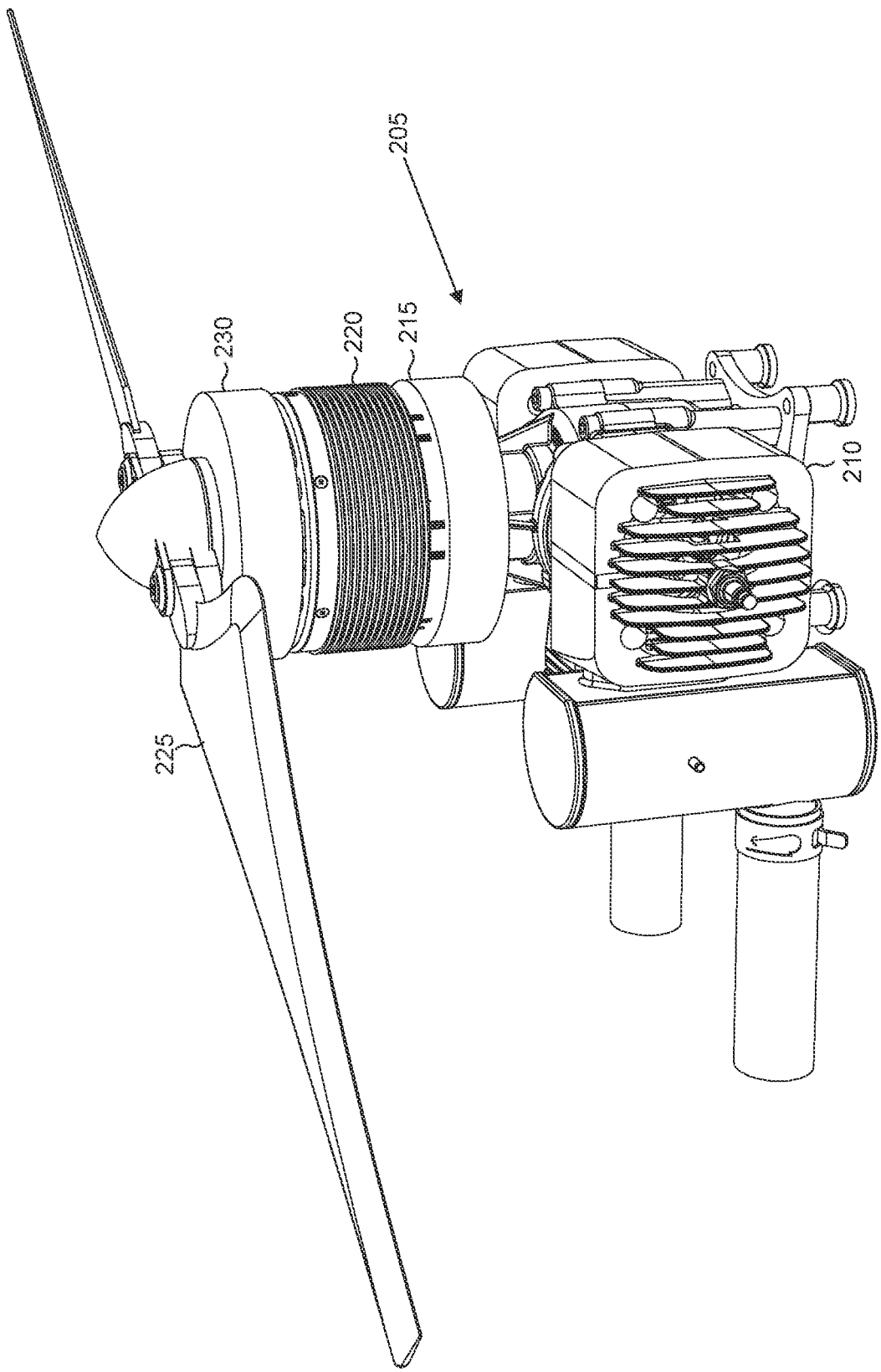
FIGS. 16B and 16C are a pictorial diagrams that illustrates other alternative example embodiments of an internal combustion engine power unit that includes a second clutch.

FIG. 16A is a pictorial diagram that illustrates one example embodiment of an internal combustion engine power unit. According to this example embodiment, of internal combustion power unit 205 comprises an internal combustion engine 210, a clutch 215, a motor-generator 220, and a mechanical-rotor 225. This particular embodiment is referred to as a single-clutch embodiment. In such a single-clutch embodiment, the clutch 215, as heretofore described, selectively engages mechanical power from the internal combustion engine 210 to the motor-generator 220. In this embodiment, the motor-generator 220 is directly coupled to the mechanical-rotor 225. As also heretofore described, when a flameout of the internal combustion engine occurs, the clutch 215 disengages the motor-generator 220 and the mechanical-rotor 225 from the internal combustion engine 210. Hence, in a flameout condition, the motor-generator 220 operates as a motor in order to continue to provide mechanical power to the mechanical-rotor 225.

Figure 16C:
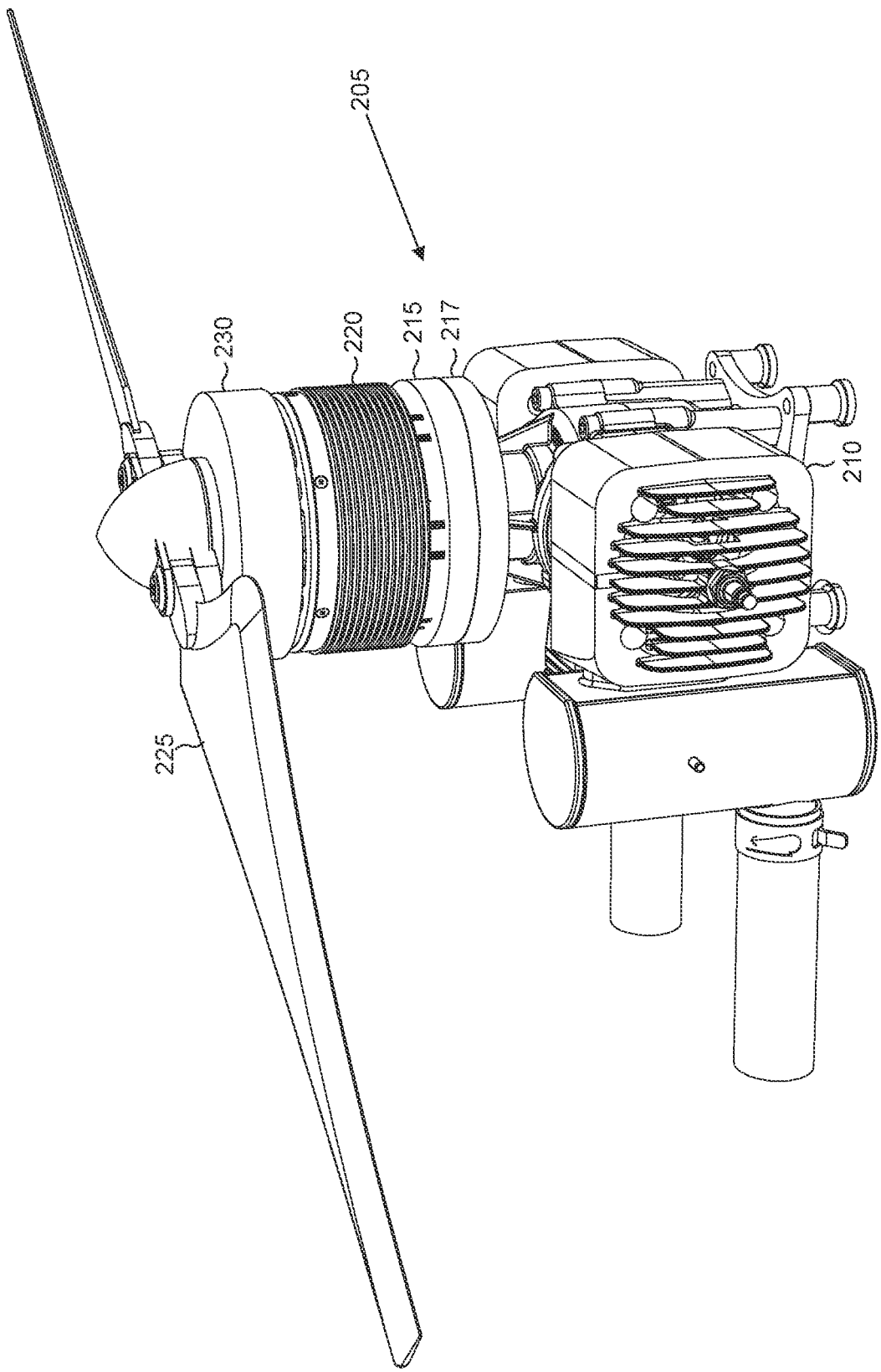

FIGS. 16B and 16C are a pictorial diagrams that illustrates other alternative example embodiments of an internal combustion engine power unit that includes a second clutch. As heretofore described, some example embodiments of a power unit include a second clutch, which enables embodiments to operate according to additional operating modes as heretofore described. As illustrated in the FIG. 16B, one alternative example embodiment of an internal combustion engine power unit 205 includes an internal combustion engine 210, a first clutch 215, a motor-generator 220, and a second clutch 230. FIG. 16C illustrates that, according to another alternative example embodiment, an internal combustion engine power unit 205 comprises an internal combustion engine 210, a gear-box 217, a first clutch 215, a motor-generator 220, and a second clutch 230.

In the alternative example embodiment depicted in FIG. 16B, the motor-generator 220 is coupled to an included rotor 225 by the second clutch 230. Accordingly, additional control is provided for supporting operating modes wherein the propeller 225 is not operated when the motor-generator 220 is driven by the internal combustion engine 210 by closing the first clutch 215, but leaving the second clutch 230 open. This allows the power unit to generate electrical power from mechanical work derived from the internal combustion engine 210 without providing thrust since the rotor 225 is not engaged in this operational mode, see operating mode 4 in table above. This same clutch configuration also supports operating mode 4, which provides for starting the internal combustion engine 210 by using the motor-generator 220 as a starter motor.

FIG. 16C depicts an alternative embodiment that further includes a gear-box 217, which is disposed to receive mechanical power from the internal combustion engine 210, The gear-box reduces the rotational-speed of the mechanical power received from the internal combustion engine 210. The reduced-speed mechanical power is then directed from the gear-box 210 to the motor-generator 220.

In sharp contrast to prior-art hybrid-drive systems, the present method and various alternative example embodiments thereof use mechanical power from the internal combustion engine to drive a propeller directly. Now, only a portion of the mechanical power from the internal combustion engine is used to generate electrical power. In the hybrid-drive system described by Phan, all the power from the internal combustion engine is converted to electrical energy, which is used to drive propellers driven by electric motors.

Figure 17A:
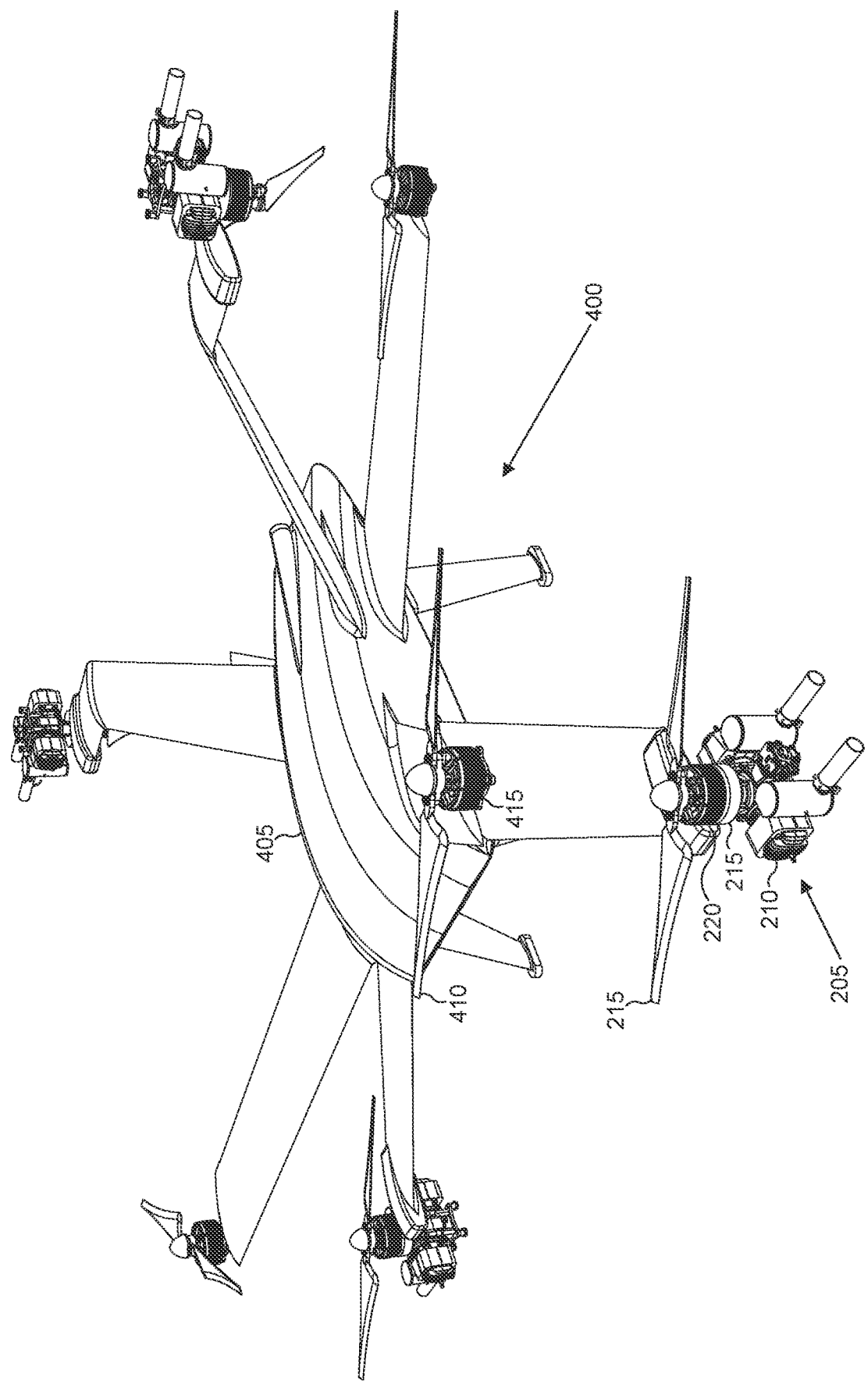
FIG. 17A is a pictorial illustration that depicts one example embodiment of a multi-rotor airframe.
Figure 17B:
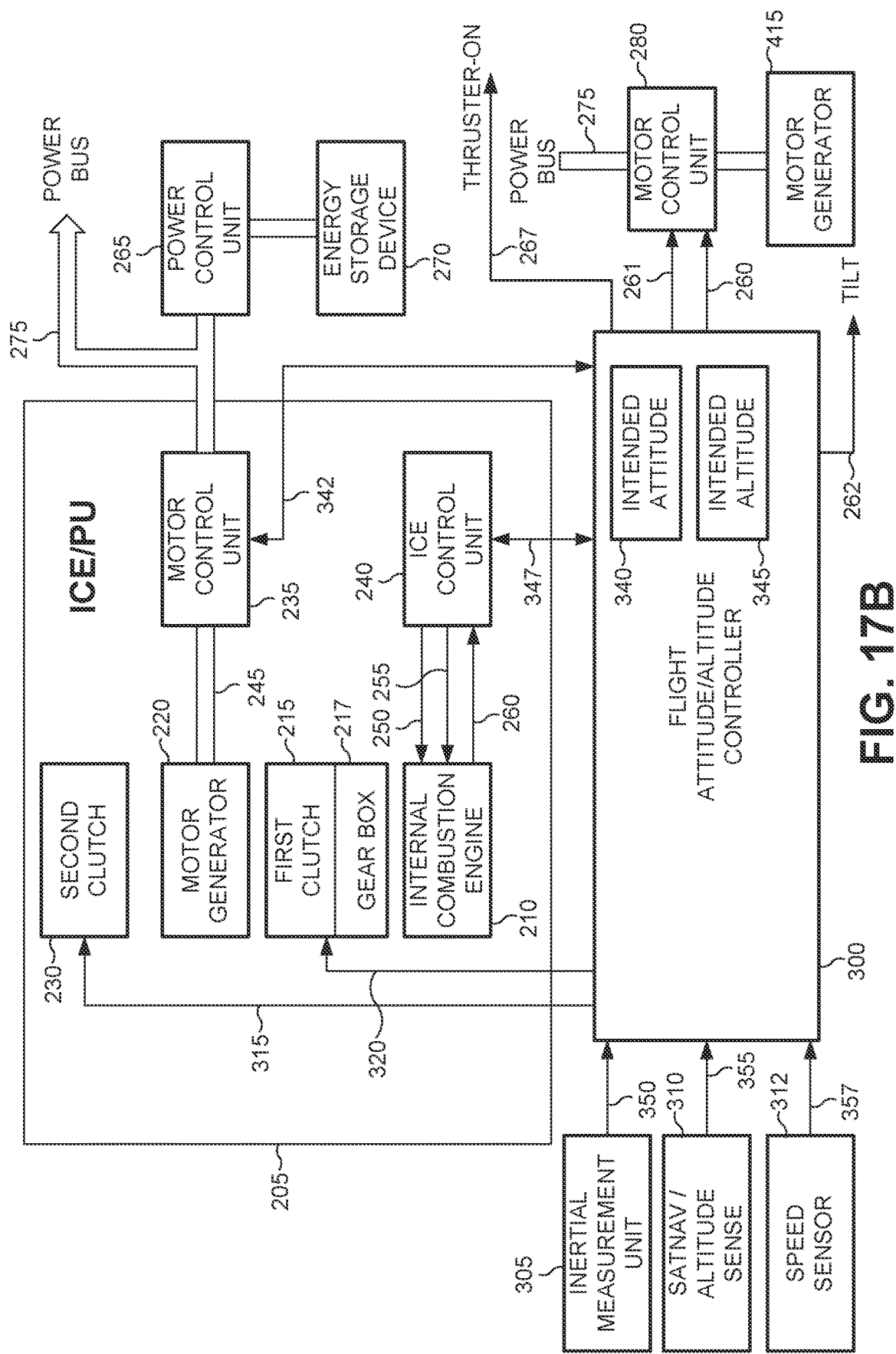
FIG. 17B illustrates that the multi-rotor airframe of this example embodiment also includes an energy storage device 270.

FIG. 17A is a pictorial illustration that depicts one example embodiment of a multi-rotor airframe. FIG. 17B is a block diagram that depicts one example embodiment of a wiring structure for connecting components in an airframe. In this example embodiment, an airframe 400 includes a body portion 405 and one or more internal combustion engine power units 205. It should be appreciated that, according to one alternative example embodiment, the airframe 405 includes three such internal combustion engine power units 205. And in yet another alternative example embodiment, the airframe 405 includes four such internal combustion engine power units 205. It should likewise be appreciated that these example embodiments are not intended to limit the scope of the claims appended hereto and then various alternative embodiments are contemplated that include various numbers of internal combustion engine power units 205.

FIG. 17B illustrates that the multi-rotor airframe of this example embodiment also includes an energy storage device 270. The energy storage device 270, which according to alternative example embodiments comprises at least one or more of a battery and/or a super capacitor, is electrically coupled to a power control unit 265. Power control unit 265 operates to charge the energy storage device 270 by receiving electrical power from a power bus 275 and directing a charge current, derived from the power bus 275, to the energy storage device 270.

FIG. 17A further illustrates that, according to this example embodiment, the multi-rotor airframe includes a first rotor 215, which is oriented to direct thrust in a substantially downward direction. The first rotor 215 is mechanically coupled to a first motor-generator 220 included in a first ICE power unit 205. The first motor-generator 220 is coupled to the first internal combustion engine 210 by means of a first clutch 215. The first clutch 215 serves as a mechanical coupler that is capable of selectively applying mechanical power generated by the first internal combustion engine 210 to the first motor-generator 220. An optional gear-box 217 is included in some alternative embodiments. In these alternative embodiments, the gear-box changes the rotational speed of mechanical power generated by the first internal combustion engine 210.

FIG. 17B further illustrates that, according to this example embodiment, the first motor-generator 220 is electrically connected 245 to a first motor control unit 235. The first motor control unit 235, in one operating mode, receives electrical power generated by the motor-generator 220 and directed to a power bus 275, included in this example embodiment. Accordingly, this path provides a means whereby the first motor-generator 220 is capable of directing power to the energy storage device 270.

FIG. 17A also illustrates that, according to this example embodiment, the multi-rotor airframe 400 further includes a second rotor 410. In this example embodiment, the second rotor 410 is capable of generating thrust in a substantially downward direction when mechanical work is applied thereto. A second motor-generator 415, included in this example embodiment, is coupled to the second rotor 410.

FIG. 17B further illustrates that the second motor-generator 415 is controlled by a second motor control unit 280. The second motor control unit 280 receives electrical power from the power bus 275 and directs the electrical power to the second motor-generator 415. It should be appreciated that the power bus 275 is depicted in the figures in order to illustrate one alternative example embodiment and is depicted in the figures for the sake of convenience to allow better comprehension of how electrical power is electrically coupled from the energy storage device 270 to any other particular element in a multi-rotor airframe. Accordingly, such limitation details of various alternative example embodiments are not intended to limit the scope of the claims appended hereto.

This example embodiment of a multi-rotor airframe also includes a flight controller 300 and an attitude sensor 305. It should be appreciated that, according to one alternative example embodiment, the attitude sensor 305 comprises an inertial measurement unit 305. The inertial measurement unit 305, according to various alternative example embodiments, comprises at least one or more of a mechanical gyroscope, an optical-energy gyroscope, and/or a monolithic semiconductor device. In any of these alternative example embodiments, the attitude sensor 305 generates an attitude signal 350. The flight controller 300 receives the attitude signal 350 and generates a first correction signal 260. The first correction signal 260 is electrically coupled to the second motor control unit 280.

In operation, the flight controller 300 of this example embodiment adjusts the power to be applied to the second motor-generator 415 in order to maintain attitude in accordance with an intended attitude value 340 maintained in the flight controller 300. As such, the second motor-generator 415 provides varying amounts of mechanical power to the second rotor 410. Because the motor-generator provides better power responsiveness, it allows for agile control of attitude based on the first correction signal 260, which is generated by the flight controller 300.

It should likewise be appreciated that, depending on the magnitude and polarity of the first correction signal 260, the second motor control unit 280 causes the second motor-generator 415 to apply additional power, to the limit of its power ability, or to reduce power to the limit of his minimum power ability. It should be noted that, according to various alternative embodiments, the minimum power ability of a particular motor-generator 415 includes an off state, wherein no mechanical work is generated by the second motor-generator 415.

In certain situations, attitude of the multi-rotor airframe cannot be maintained by using the mechanical power provided by the second motor-generator 415. Accordingly, the flight controller 300 of one alternative example embodiment generates a second correction signal, which is directed to an internal combustion engine control unit 240. It should be appreciated that, according to one alternative example embodiment, the internal combustion engine control unit 240 is communicatively coupled 347 to the flight controller 300 by means of a bidirectional data channel. In this embodiment, a message is sent from the flight controller 300 to the ICE control unit 240 in order to direct the ICE 242 either apply additional power, or reduce the power applied to the first rotor 215. This is accomplished by increasing or decreasing fuel consumption by the first internal combustion engine 210. Fuel consumption by the first internal combustion engine 210 is controlled by a throttle signal 250. The ICE control unit 240 adjusts the throttle signal in order to increase or decrease the amount of mechanical work applied by the first internal combustion engine 210 the first rotor 215.

According to yet another alternative example embodiment, the flight controller 300, using an included control signal 342, directs the first motor control unit 235 to cause the first motor-generator 220 to receive electrical power from the power bus 275 in order to generate additional mechanical work for application to the first rotor 215. This functionality is provided to enable additional attitude control. It should likewise be appreciated that, according to various alternative example embodiments, additional attitude control is provided either by adjusting the amount of power delivered by the first internal combustion engine 210. In another alternative example embodiment, additional attitude control is provided by adjusting the amount of power delivered by the first motor-generator 220. It should likewise be appreciated that, according to various alternative example embodiments, the power bus 275 receives electrical power, by way of the power control unit 265, from the energy storage device 270.

In certain operational modes, for example when additional lifting capacity is required, the first motor control unit 235 is capable of receiving electrical power from the power bus 275 and directing the electrical power to the first motor-generator 220. In this manner, the amount of mechanical work applied to the first rotor 215 includes mechanical work generated by the first internal combustion engine 210 and mechanical work generated by the first motor-generator 220. This provides greater thrust capability the first rotor 215, which is useful for increasing the altitude with a heavy payload. According to this alternative example embodiment, the first motor control unit 235 receives a control signal 342 from the flight controller 300. The flight controller 300 directs the first motor control unit 235 to enable additional mechanical work to be generated by the first motor-generator 220 when additional lift, is necessary in order to maintain, or increase altitude of the airframe.

FIG. 17B also illustrates that, according to one alternative example embodiment, the ICE control unit provides a starting function, which is initiated by a message received from the flight controller 300. Again, such message is received by the ICE control unit 240 by means of a bidirectional data communications path 347. Starting function provided by the ICE control 240 includes a choke control signal 255. In operation, the ICE control unit 240 receives engine rotations per minute ("RPM") indications by means of an RPM feedback signal 260. Based on this alternative example embodiment, the ICE control unit 240 manipulates the throttle signal 250 in conjunction with the choke control signal 255 in order to start the internal combustion engine 210.

It should also be appreciated that, according to one alternative example embodiment, the throttle control input included in the first internal combustion engine 210 is responsive to a lift signal received from the flight controller 300. As heretofore described, the flight controller directs a lift message to the ICE control unit 240 by way of a bidirectional communications path 347. Accordingly, the ICE control unit 240 will increase the amount of work to be delivered by the first internal combustion engine 210 in order to increase altitude of the payload. This is accomplished by increasing the amount of fuel consumed by the internal combustion engine, which is affected by manipulating the throttle signal 250.

FIG. 17C is a block diagram that depicts one alternative example embodiment of a flight controller 300. According to one alternative example embodiment, the flight controller 300 includes an intended attitude indicator 340. The intended attitude indicator 340 is compared, by means of a first included differencing amplifier 342, against the attitude signal 350 generated by the attitude sensor 305. The differencing amplifier 342 included in this alternative example embodiment then generates the first correction signal 260.

In yet another alternative example embodiment, the flight controller 300 includes a second differencing amplifier 347. According to one alternative example embodiment, the second differencing amplifier 347 generates a second correction signal 342, which the second differencing amplifier 347 communicates to the ICE control unit 240 by way of a digital message 34. In operation, when the first correction signal 260 reaches a control limit, the second differencing amplifier 347 generates the second correction signal (i.e. either 342 or 347) to cause at least one or more of the first motor-generator 220 and/or the first internal combustion engine 210 to provide additional power to the first rotor 215. This is done to add additional attitude control capability when the second rotor 410, which is driven by the second motor-generator 415, is unable to maintain the attitude correction according to the first correction signal 260.

Figure 18:
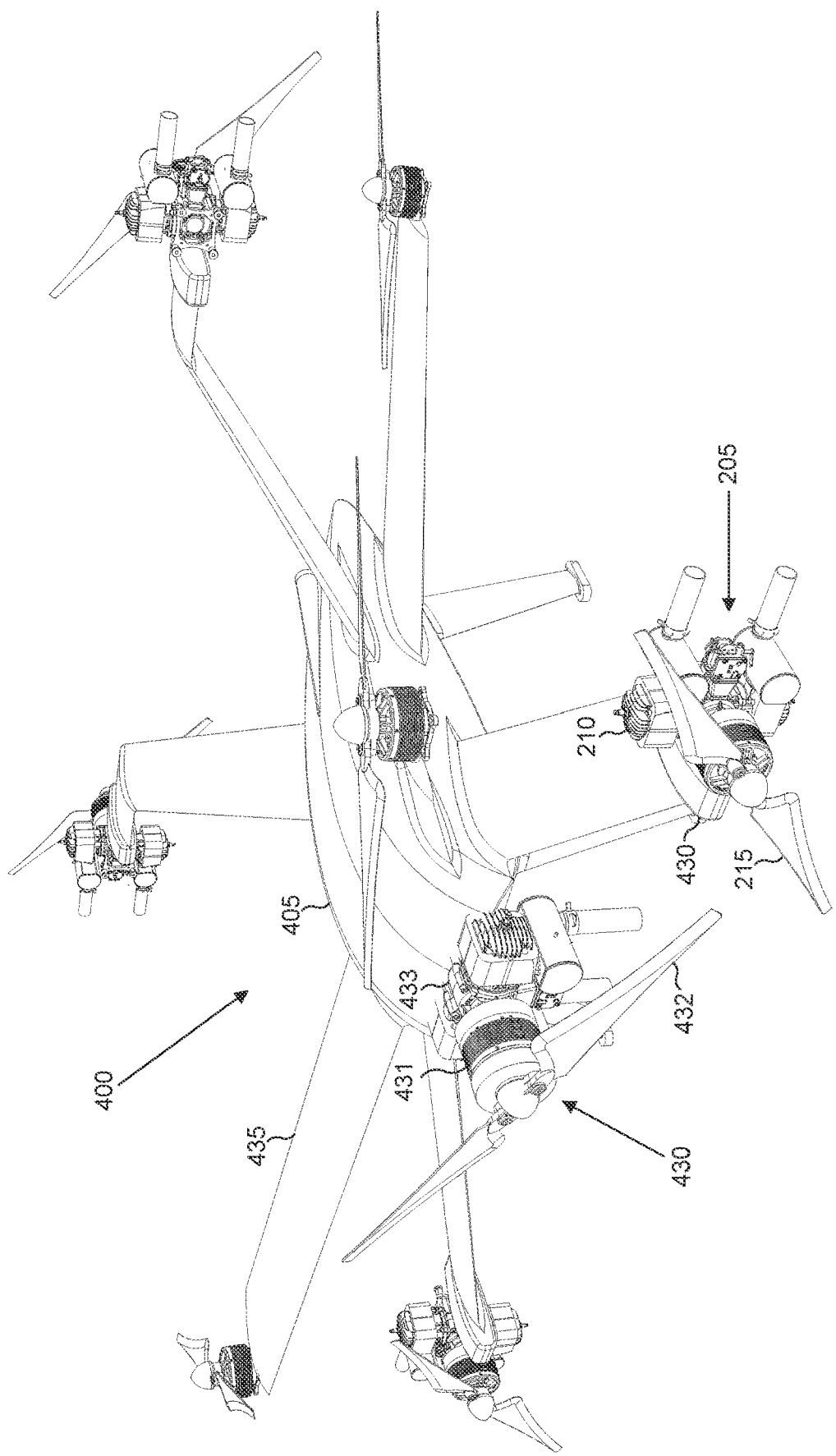
FIG. 18 is a pictorial diagram that illustrates one alternative example embodiment of an airframe that supports a forward-flight mode.

FIG. 18 is a pictorial diagram that illustrates one alternative example embodiment of an airframe that supports a forward-flight mode. According to this alternative example embodiment, the airframe 400 further includes a lifting surface 435. The lifting surface 435 of this alternative example embodiment is disposed so as to generate lift in a substantially vertical direction when it is subject to airflow. This alternative example embodiment of the airframe 400 further comprises a tilt mechanism 430. The tilt mechanism 430, when engaged, causes the first ICE power unit 205 to tilt from a vertical thrust orientation to a forward-flight thrust orientation.

Figure 19B:
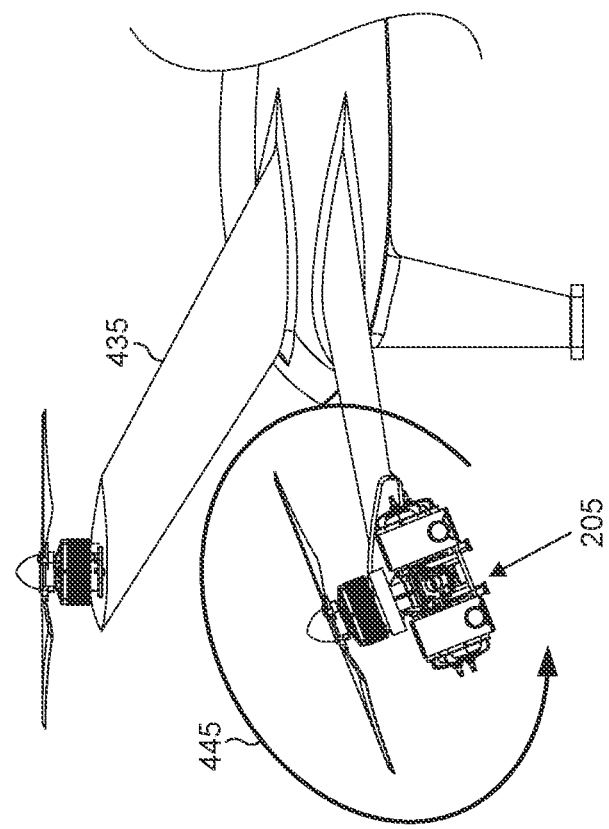
FIGS. 19A through 19D are pictorial diagrams that illustrate progression of an ICE power unit from vertical mode to forward-flight mode.
Figure 19A:
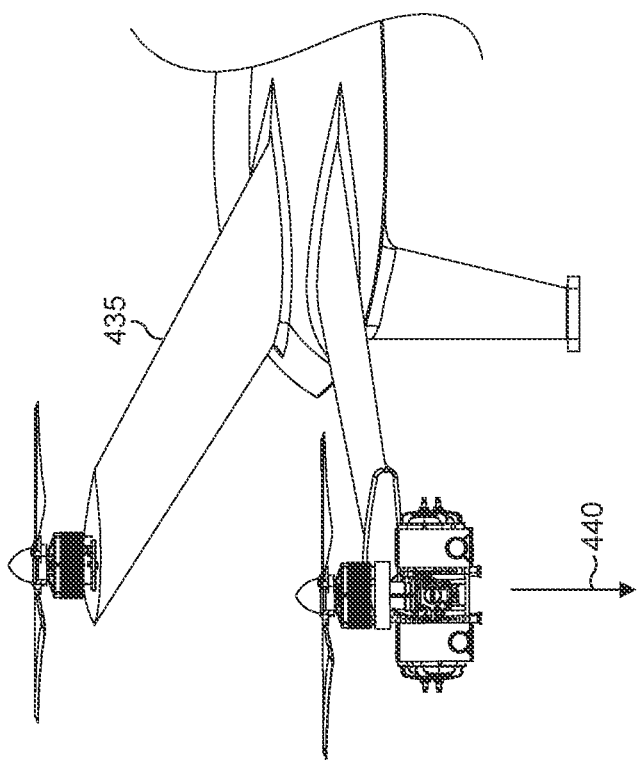
Figure 19D:
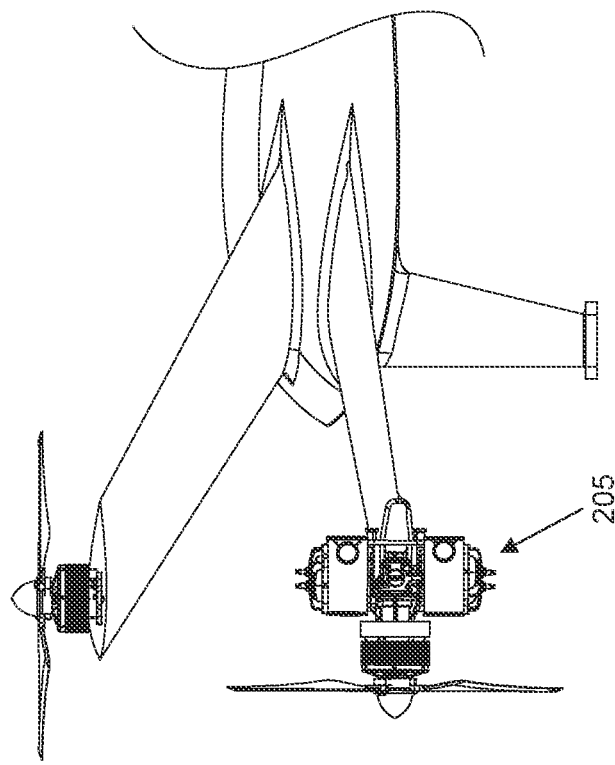
Figure 19C:
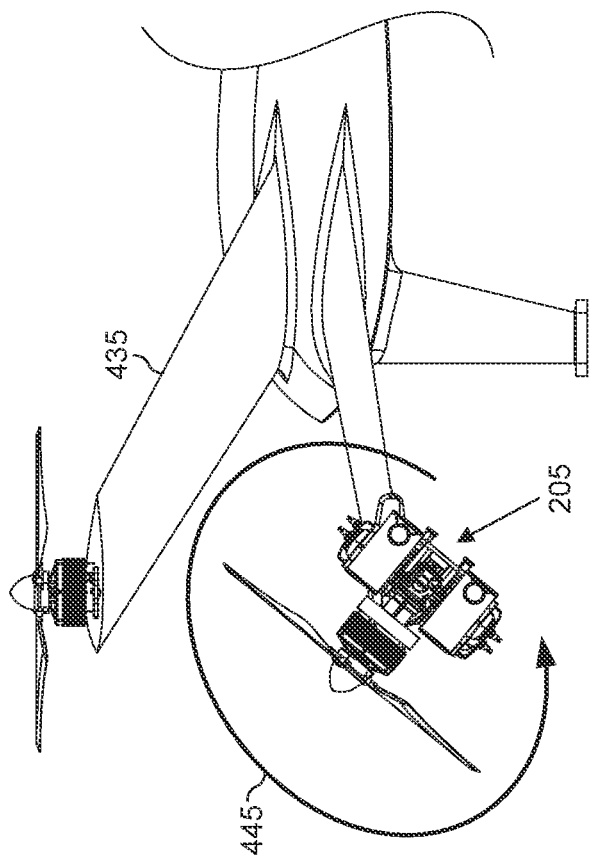

FIGS. 19A through 19D are pictorial diagrams that illustrate progression of an ICE power unit from vertical mode to forward-flight mode. It should be appreciated that, according to this alternative example embodiment of an airframe 400, the first ICE power unit 205 begins operation in a substantially vertical flight mode where in thrust 440 is directed in a substantially downward direction. As the tilt mechanism 430 is engaged, the first ICE power unit 205 begins to rotate 445 forward. As the progression begins and then continues, the thrust generated by the first rotor 225 is used to maintain lift of the airframe and also begin moving the airframe and a forward direction. At some point, there is sufficient lift generated by the lifting surface 435 to maintain forward-flight. The progression of tilting completes, as shown in FIG. 19D, and the first ICE power control unit 205 is disposed in a manner so as to direct a substantial portion of its thrust in a direction opposite to that of an intended forward-flight direction. In this example embodiment, the tilt mechanism 430 is responsive to a tilt signal 262, which is generated by the flight controller 300 when transitioning from vertical flight mode to forward-flight mode.

As the airframe begins moving forward, as more thrust is directed in a direction opposite of an intended forward-flight direction, lift is generated by the lifting surface. According to one alternative example embodiment, the airframe 400 further includes a speed sensor 312. A speed sensor 312 generates a speed signal 357, which is directed to the flight controller 300. When forward-flight is achieved, the flight controller 300, upon sensing sufficient forward-flight speed, commands the second motor-generator 415 to power off. This is accomplished by manipulating the first correction signal 260. This is further illustrated in FIG. 17C where in the speed signal 357 causes the first difference amplifier 342 to drive the first correction signal 260 to a state that causes the second motor-generator to shut off. In some alternative example embodiments, the second motor control unit 280 includes a second input for shutting down the second motor-generator 415 according to a shutdown signal 261 generated by the flight controller 300.

FIG. 17C also illustrates that, according to one alternative example embodiment, the flight controller 300 also receives an altitude signal 355. In this alternative example embodiment, the airframe 400 includes an altitude sensor 310. In various alternative example embodiments, the altitude sensor comprises a satellite navigation receiver 310. A third differencing amplifier 349 included in this alternative example embodiment of a flight controller 300 compares an intended altitude indicator 345, maintained in the flight controller 300, to the altitude signal 355 received from the altitude sensor 310. An adjustment to altitude is affected by means of a correction signal, which is communicated to the ICE control unit 240 by means of a digital message 347. The ICE control unit 240, in turn, adjusts the amount of power generated by the internal combustion engine 210 through manipulation of the throttle signal 250.

FIG. 18 also illustrates one alternative example embodiment of an airframe 400 that includes a forward thruster 430. It should be appreciated that, according to this alternative example embodiment, the forward thruster 430 includes a forward-thrust rotor 432 mechanically coupled to at least at least one or more of an internal combustion engine 433, a motor-generator 431 and/or an electric motor 431. In this alternative example embodiment, the first ICE power unit 205 is not tilted in a forward manner in order to achieve forward-flight. Forward-flight, according to this alternative example embodiment, is affected by thrust provided by thruster 430. When forward-flight is achieved, the flight controller 300 of this alternative example embodiment shuts down the first ICE power unit 205 and the second motor-generator 415 in order to help achieve stable flight.

Figure 20:
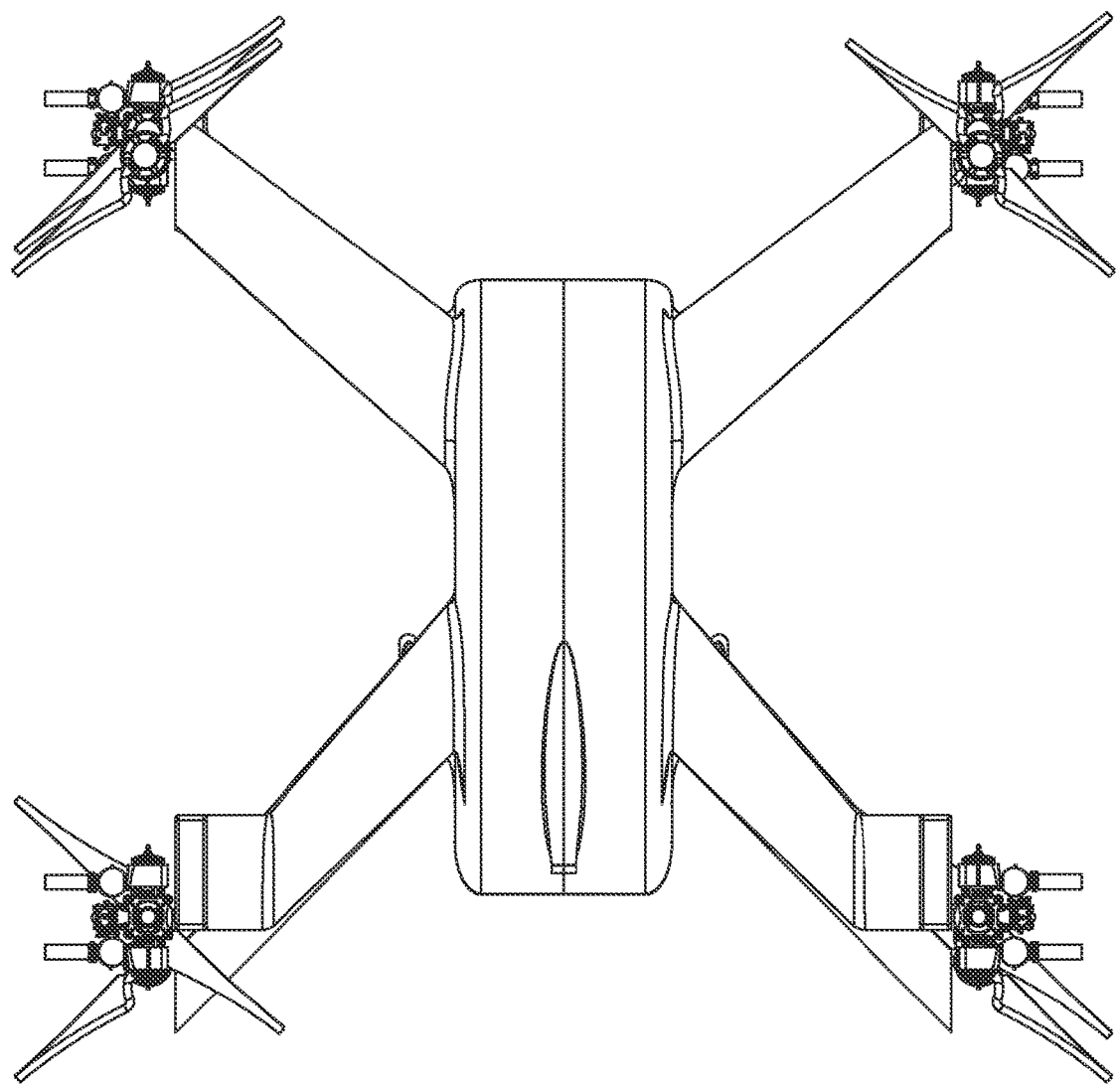
FIGS. 20 through 22 are pictorial diagrams that depict the relative placement of rotors in one alternative example embodiment of a multi-rotor airframe.
Figure 21:
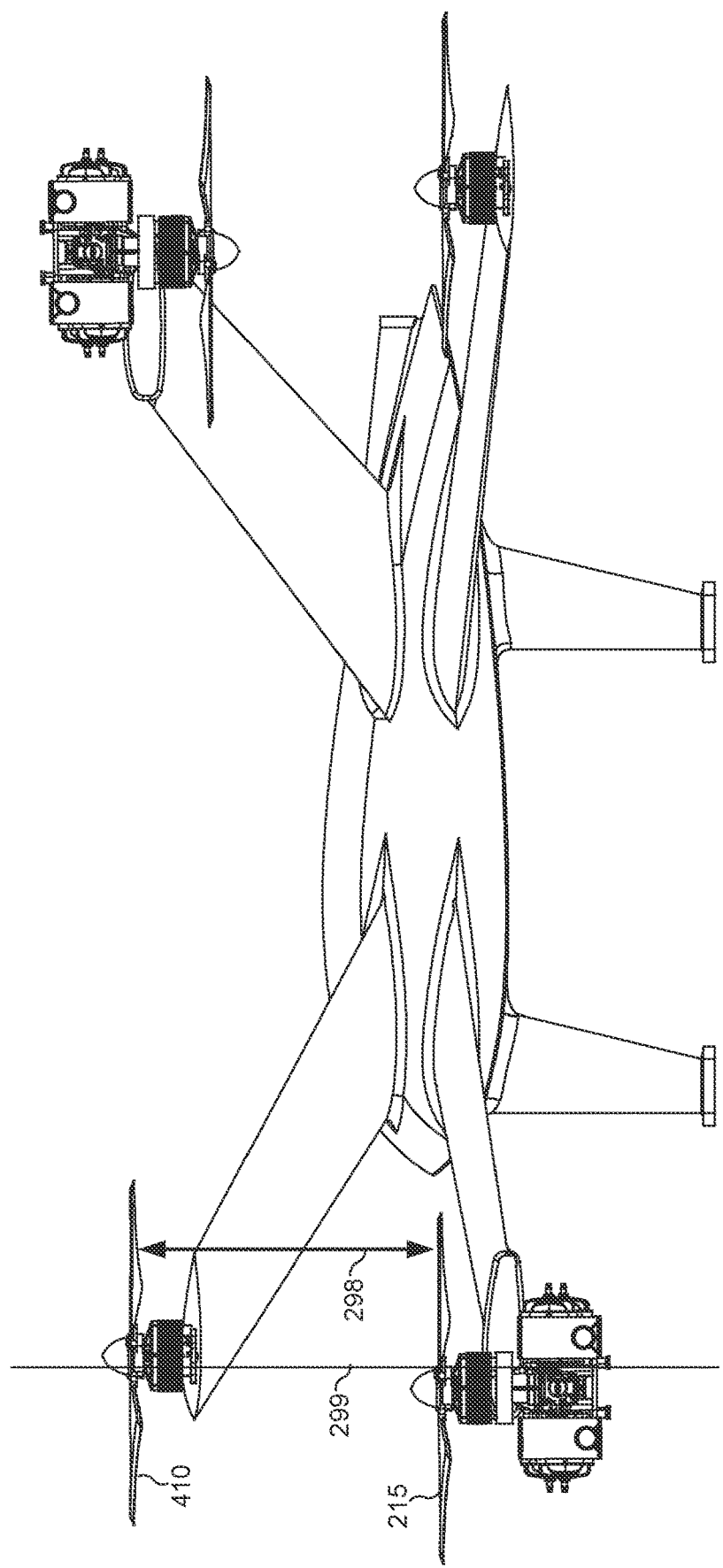
Figure 22:
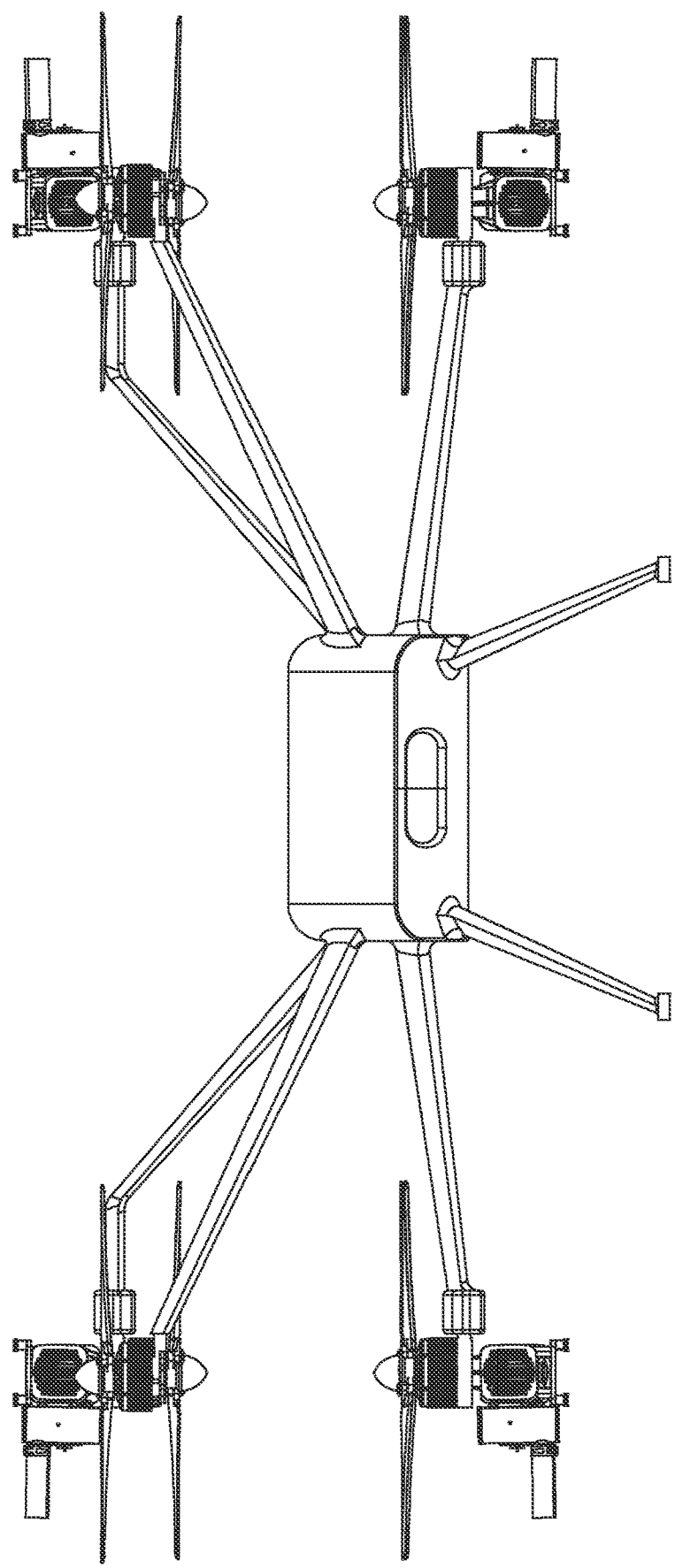

FIGS. 20 through 22 are pictorial diagrams that depict the relative placement of rotors in one alternative example embodiment of a multi-rotor airframe. It should be appreciated that, according to various alternative example embodiments, the first rotor and the second rotor are substantially coaxial when the airframe is in a vertical flight mode. This is apparent from the figures herein presented. FIG. 21 further clarifies that the first rotor 215 and the second rotor 410 are substantially coaxial in an axis 299 substantially orthogonal to a vertical flight attitude. FIG. 21 also illustrates that the vertical separation 298 between the first rotor 215 and the second rotor 410 is maintained at a minimum distance so as to minimize turbulence in various flight modes, including when transitioning from a vertical flight mode to a forward-flight mode by tilting the first rotor 215 in a forward direction.

Figure 23:
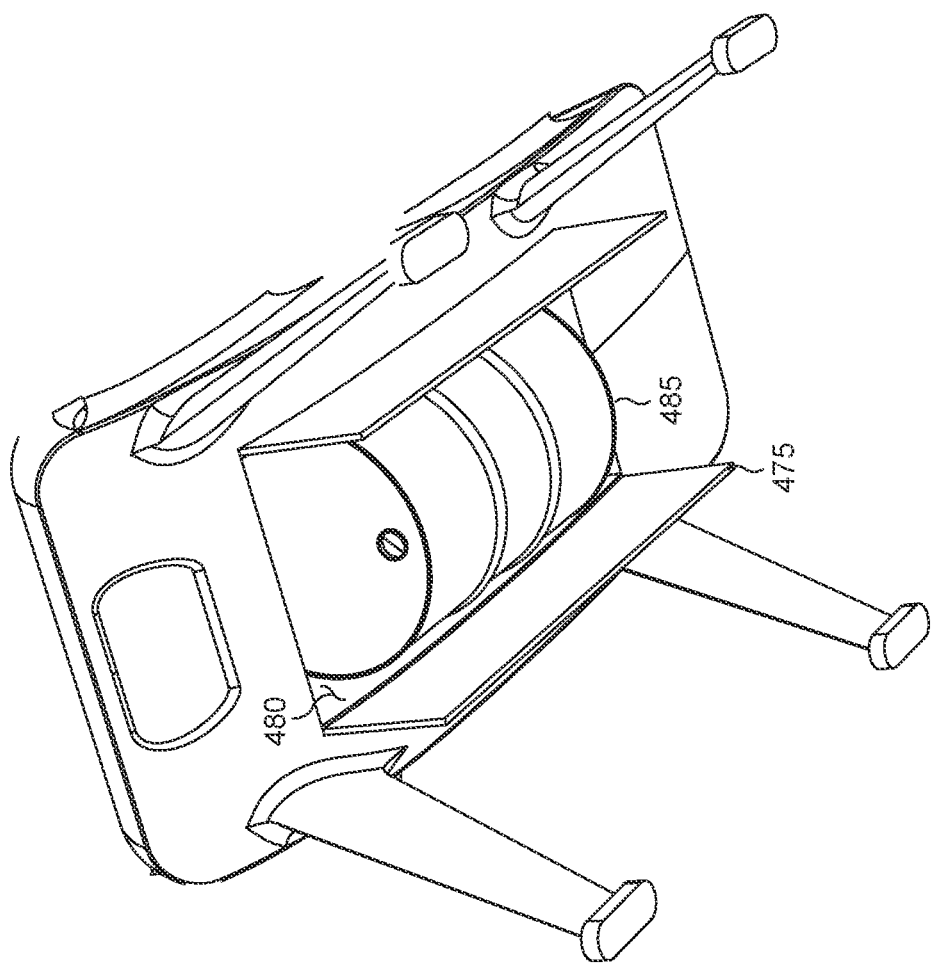
FIG. 23 is a pictorial diagram that depicts one alternative embodiment of an airframe that includes a secondary payload compartment.

FIG. 23 is a pictorial diagram that depicts one alternative embodiment of an airframe that includes a secondary payload compartment. In one alternative embodiment, the airframe further includes a secondary payload compartment 480. In yet another alternative embodiment, the airframe further includes a door structure 475 that is automatically engaged to enclose a secondary payload 485 in the payload compartment 480.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A multi-rotor airframe comprising:
a body portion;
an energy storage device coupled to the body portion and configured to store electrical power;
a first propulsion assembly mounted to the body portion and comprising a first internal combustion engine assembly, a first clutch, a first motor-generator, and a first rotor, wherein the first internal combustion engine assembly comprises a first internal combustion engine and a first internal combustion engine assembly output shaft, wherein the first motor-generator comprises a first motor-generator drive shaft having an input end and an output end, wherein the first rotor is configured to generate a first thrust in response to mechanical work transmitted to the first rotor by the first motor-generator drive shaft, wherein the first clutch is disposed between the first internal combustion engine assembly and the first motor-generator and operable to drivingly couple the input end of the first motor-generator drive shaft to the output end of the first internal combustion engine assembly output shaft and to drivingly uncouple the input end of the first motor-generator drive shaft from the output end of the first internal combustion engine assembly output shaft, wherein the first propulsion assembly is operable to rotate the first rotor via rotation of the first motor-generator drive shaft so that the first thrust is applied to the body portion in an upward direction relative to the body portion, and wherein the first motor-generator is operable to start the first internal combustion engine;
a first motor controller configured to receive electrical power generated by the first motor-generator and direct the electrical power to the energy storage device;
a second propulsion assembly comprising a second motor-generator and a second rotor, wherein the second motor-generator comprises a second motor-generator drive shaft having an output end, wherein the second rotor is configured to generate a second thrust in response to mechanical work applied to the second rotor via the second motor-generator drive shaft, wherein the second propulsion assembly is mounted to the body portion and operable to rotate the second rotor via rotation of the second motor-generator drive shaft so that the second thrust is applied to the body portion in a downward direction relative to the body portion, and wherein the downward direction is opposite to the upward direction;
a second motor controller configured to receive electrical power from the energy storage device and direct the electrical power to the second motor-generator;
an attitude sensor that is configured to generate an attitude signal according to an attitude of the multi-rotor airframe; and
a flight controller that generates a first correction signal according to the attitude signal and an intended attitude value,
wherein the first correction signal is directed to the second motor controller, and the second motor controller directs the electrical power to the second motor-generator in accordance with the first correction signal.

2. The multi-rotor airframe of claim 1, wherein the first internal combustion engine assembly comprises:
a gear-box for reducing a rotation rate of the output end of the first internal combustion engine assembly output shaft relative to a rotational speed of the first internal combustion engine.

3. The multi-rotor airframe of claim 1, wherein the first motor controller is further configured to receive electrical power from the energy storage device and direct the electrical power received from the energy storage device to the first motor-generator, and
wherein the first motor-generator is configured to convert the electrical power to mechanical power applied to the first rotor.

4. The multi-rotor airframe of claim 1, wherein the flight controller is configured to generate a second correction signal according to the attitude of the multi-rotor airframe and according to the first correction signal, and
wherein the first motor controller further includes a correction input and is configured to cause electrical power to be applied to the first motor-generator according to the second correction signal when the attitude signal indicates there is an attitude error, and the first correction signal indicates that the first correction signal is at a control limit.

5. The multi-rotor airframe of claim 1, wherein the flight controller is configured to generate a second correction signal according to an attitude of the multi-rotor airframe and according to the first correction signal, and
wherein the first internal combustion engine further includes a throttle control input and is configured to adjust power to be applied to the first rotor according to the second correction signal when the attitude signal indicates there is an attitude error and the first correction signal indicates that the first correction signal is at a control limit.

6. The multi-rotor airframe of claim 1, wherein the first internal combustion engine further includes a throttle control input, and
the flight controller is configured to generate a lift signal that, when received by the throttle control input, causes the first internal combustion engine to increase power applied to the first rotor.

7. The multi-rotor airframe of claim 1, further comprising:
a lifting surface attached to the multi-rotor airframe, wherein the lifting surface is configured to generate lift in a substantially vertical direction relative to the body portion when subject to an airflow; and
a tilt mechanism configured to enable the first rotor to tilt about an axis substantially parallel to a pitch-axis of the multi-rotor airframe,
wherein the flight controller is further configured to generate a tilt signal, and
wherein the tilt mechanism is configured to respond to the tilt signal by tilting the first rotor so as to cause a portion of the first thrust generated by the first rotor to be directed in a direction opposite to a desired direction of flight.

8. The multi-rotor airframe of claim 7, further comprising:
a speed sensor configured to generate a speed signal according to a forward path of the multi-rotor airframe,
wherein the flight controller is further configured to generate a power-down signal when the speed signal indicates that a forward speed of the multi-rotor airframe reached a predetermined threshold where the lifting surface generates lift that supports the multi-rotor airframe,
wherein the second motor controller includes a power-down input, the second motor controller configured to discontinue application of electrical power to the second motor-generator when a power-down process is active.

9. The multi-rotor airframe of claim 1, further comprising:
a forward thruster comprising at least one or more of a dedicated internal combustion engine, a dedicated motor-generator, and a dedicated electric motor coupled to a dedicated rotor,
wherein the flight controller generates a turn-on signal to turn on the forward thruster,
wherein the flight controller is configured to shut down the first internal combustion engine and the second motor-generator upon determining that forward flight is achieved.

10. The multi-rotor airframe of claim 1, wherein:
the first propulsion assembly comprises a second clutch disposed between the first motor-generator and the first rotor and operable to drivingly couple the first rotor to the output end of the first motor-generator drive shaft and to drivingly uncouple the first rotor from the output end of the first motor-generator drive shaft; and
the first internal combustion engine and the first clutch are operable to supply mechanical power to the first motor-generator via rotation of the first motor-generator drive shaft while the first rotor is uncoupled from the output end of the first motor-generator drive shaft via the second clutch.

11. The multi-rotor airframe of claim 1, wherein:
the first propulsion assembly is mounted to the body portion so that the first rotor is offset from the first internal combustion engine assembly in the upward direction relative to the body portion; and
the second propulsion assembly is mounted to the body portion so that the second rotor is offset from the second motor-generator in the downward direction relative to the body portion.

* * * * *